(12) United States Patent
Nakata et al.

(10) Patent No.: US 7,317,672 B2
(45) Date of Patent: Jan. 8, 2008

(54) OPTICAL HEAD

(75) Inventors: Hideki Nakata, Soraku-gun (JP);
 Hironori Tomita, Ikoma (JP); Hideki Aikoh, Higashiosaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/526,646

(22) PCT Filed: Sep. 5, 2003

(86) PCT No.: PCT/JP03/11334

§ 371 (c)(1),
(2), (4) Date: Mar. 3, 2005

(87) PCT Pub. No.: WO2004/023464

PCT Pub. Date: Mar. 18, 2004

(65) Prior Publication Data

US 2006/0007838 A1 Jan. 12, 2006

(30) Foreign Application Priority Data

Sep. 6, 2002 (JP) .............................. 2002-261589

(51) Int. Cl.
*G11B 7/12* (2006.01)
(52) U.S. Cl. ............................. 369/53.19; 369/44.32; 369/112.12
(58) Field of Classification Search ............. 369/53.19, 369/44.32, 44.12, 44.41, 53.28, 112.12; 399/53.19
See application file for complete search history.

(56) References Cited

U.S. PATENT DOCUMENTS

| | | | | |
|---|---|---|---|---|
| 5,216,649 A | * | 6/1993 | Koike et al. | 369/44.23 |
| 5,231,621 A | * | 7/1993 | Matsui et al. | 369/44.32 |
| 5,234,621 A | * | 8/1993 | Weinstein et al. | 510/119 |
| 5,430,699 A | * | 7/1995 | Matsubara et al. | 369/44.32 |
| 5,481,386 A | * | 1/1996 | Shimano et al. | 369/44.12 |

(Continued)

FOREIGN PATENT DOCUMENTS

GB 2156069 A 10/1985

(Continued)

*Primary Examiner*—Wayne Young
*Assistant Examiner*—Thomas Alunkal
(74) *Attorney, Agent, or Firm*—Hamre, Schumann, Mueller & Larson, P.C.

(57) ABSTRACT

An optical head includes the following: a light beam separator (35) that includes substantial interference regions for light that is reflected from an information recording medium and travels in a straight path and ±first-order diffracted light produced by information tracks of the information recording medium, and diffracts each of plural light beams in regions (32a, 32b) of the substantial interference regions, where the amount of light is changed by a change in the relative angle between the information recording medium and the objective lens and by a shift of the objective lens in the radial direction of the information recording medium; a light-receiving element (36a, 36b) for receiving the light beam that is reflected by the information recording medium and separated by the light beam separator (35); and an arithmetic circuit that corrects a value of an electrical signal detected by the light-receiving element (36a, 36b) in accordance with a radial position signal corresponding to the amount of shift of the objective lens in the radial direction of the information recording medium, and detects the relative angle between the information recoding medium and the objective lens.

30 Claims, 23 Drawing Sheets

U.S. PATENT DOCUMENTS

| | | | |
|---|---|---|---|
| 5,511,059 A * | 4/1996 | Brazas, Jr. | 369/112.12 |
| 5,523,989 A * | 6/1996 | Ishibashi | 369/44.32 |
| 5,544,143 A * | 8/1996 | Kay et al. | 369/112.07 |
| 5,602,383 A * | 2/1997 | Takekoshi et al. | 369/112.15 |
| 5,689,492 A * | 11/1997 | Brazas et al. | 369/112.09 |
| 5,737,296 A * | 4/1998 | Komma et al. | 369/44.23 |
| 5,751,680 A * | 5/1998 | Ishibashi et al. | 369/109.01 |
| 5,978,332 A * | 11/1999 | Itakura et al. | 369/44.32 |
| 6,192,020 B1 * | 2/2001 | Takasuka et al. | 369/103 |
| 6,320,699 B1 * | 11/2001 | Maeda et al. | 359/637 |
| 6,525,332 B1 * | 2/2003 | Chang et al. | 250/559.37 |
| 6,804,180 B2 * | 10/2004 | Katayama | 369/44.32 |
| 2001/0036137 A1 * | 11/2001 | Katayama | 369/53.19 |
| 2002/0048243 A1 | 4/2002 | Yanagisawa et al. | |
| 2002/0097660 A1 * | 7/2002 | Komma et al. | 369/112.04 |

FOREIGN PATENT DOCUMENTS

| | | |
|---|---|---|
| JP | 60-127630 | 8/1985 |
| JP | 61-239440 | 10/1986 |
| JP | 9-138962 | 5/1997 |
| JP | 2001-167461 | 6/2001 |

* cited by examiner

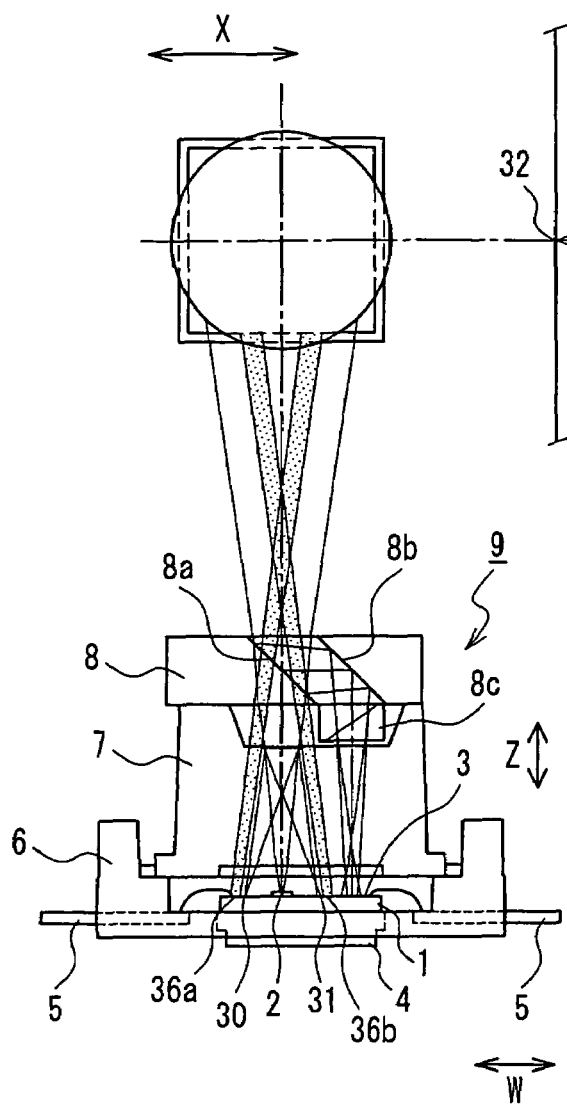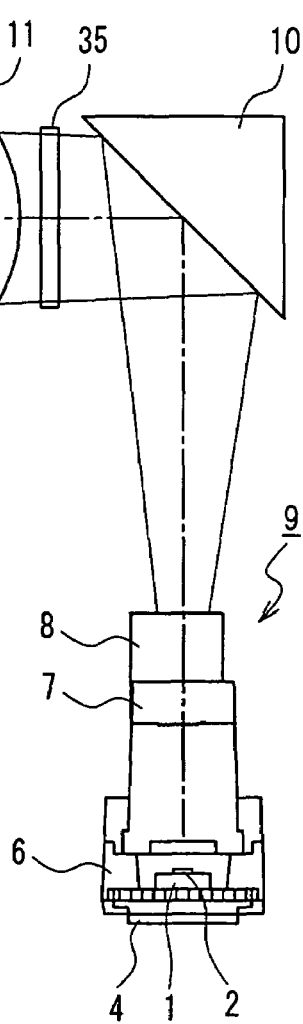
FIG. 1A                FIG. 1B
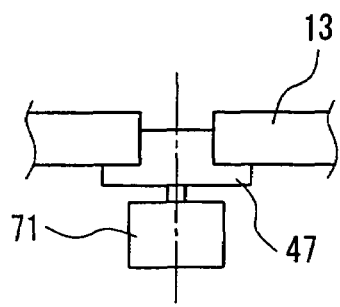
FIG. 1C

OPTICAL HEAD

TECHNICAL FIELD

The present invention relates to an optical head used in a disk recording/reproducing apparatus that employs a system of projecting a light spot on an information recording medium to record/reproduce information optically. In particular, the present invention relates to a tilt detector.

BACKGROUND ART

An optical head and a disk recording/reproducing apparatus have been used in various applications such as DVD-RAM, DVD-ROM, MD, CD, and CD-R year after year, and have had even higher density, performance, quality, and added values. In recent years, the disk recording/reproducing apparatus particularly has advanced to higher density, which requires a further improvement in performance, quality, and function of the recording/reproducing system.

As the recording information of an optical disk medium becomes higher density, more improved accuracy and performance of the optical head are demanded strongly. In particular, the optical axis of an objective lens in the optical head should be precisely perpendicular to the optical disk medium. When a tilt error (also referred to as a tilt) occurs between the optical head and the optical disk medium, a technology to detect and correct the tilt error with high precision is required (see, e.g., JP 2001-167461 A).

There have been many reports on technologies for a tilt detector and a tilt corrector of the optical head in the disk recording/reproducing apparatus. An example of a conventional tilt detector of the optical head in the disk recording/reproducing apparatus will be described below by referring to the drawings.

FIG. 24 shows the schematic configuration and operating principle of a conventional tilt detector of an optical head (see, e.g., JP 60(1985)-127630 U).

In FIG. 24, reference numeral 80 is an optical disk, 81 is an optical head, 82 is a light-receiving element, 83 is a differential amplifier, 84 is a LED (light source), and 85a and 85b are photodetectors. Moreover, reference numeral 2 is a semiconductor laser, 79 is an objective lens, 47 is a turntable, 86 is a carrier, 87 is a driving gear, 88 is a DC motor, and 89 is a tilt fulcrum.

The turntable 47 holds the optical disk 80 on the holding surface and rotates it precisely at a predetermined number of revolutions around a rotation central axis R.

The optical head 81 includes the semiconductor laser 2, the objective lens 79, and an objective lens drive (not shown). A light beam from the semiconductor laser 2 enters the objective lens 79. The objective lens drive moves the position of the objective lens 79 relative to the optical disk 80 in focusing and tracking (radial) directions so that the position of a light spot formed on the optical disk 80 is controlled accurately. Moreover, light is focused on a predetermined information track of the optical disk 80, and the reflected light from the optical disk 80 is detected by the light-receiving element 82, thereby reproducing the information of the optical disk 80.

The optical disk 80 is irradiated with light from the LED 84, and the reflected light is received by the photodetectors 85a, 85b that are provided in the optical head 81. Then, the differential amplifier 83 calculates a difference between the outputs of the photodetectors 85a and 85b. In this tilt detector, light from the LED 84 is reflected by the optical disk 80 and reaches the photodetectors 85a, 85b.

When a tilt of the optical disk 80 with respect to a predetermined reference value is 0° (small) or when the relative inclination between the optical disk 80 and the optical head 81 is 0° (small), that is, when the optical axis of the objective lens 79 is perpendicular to the optical disk 80, the amount of reflected light reaching the photodetector 85a is substantially the same as that reaching the photodetector 85b.

When the optical disk 80 tilts, the reflected light from the optical disk 80 is displaced toward either of the photodetectors 85a, 85b. Therefore, an electrical signal corresponding to the tilt direction of the optical disk 80 can be obtained as an output of the differential amplifier 83 that calculates a difference between outputs of the photodetectors 85a and 85b.

For tilt correction, the optical head 81 is moved around the tilt fulcrum 89 in the radial direction of the optical disk 80 with respect to the carrier 86 by the driving gear 87, the DC motor 88, or the like, so that the optical head 81 is moved in the V direction of FIG. 24. In this case, the tilt between the optical disk 80 and the optical head 81 can be corrected in such a manner that a voltage corresponding to the output of the differential amplifier 83 is applied to the DC motor 88, and then the whole optical head 81 is inclined with respect to the carrier 86 or the optical disk 80 by using the driving gear 87 or the like.

In the conventional tilt detector of the optical head, however, variations in the angle of divergence or the emission point of the LED 84 are increased excessively, which leads to a larger variation in the amount of light received by the photodetectors 85a, 85b. Therefore, not only the detection sensitivity that is the ratio of a change in output of the differential amplifier 83 to the amount of radial tilt of the optical disk 80, but also the tilt detection accuracy of the optical disk 80 is varied significantly.

Moreover, the relative position between the LED 84 and the photodetectors 85a, 85b is changed greatly, which requires accurate positioning of the emission point of the LED 84 and the photodetectors 85a, 85b. Therefore, the number of positioning steps is increased, and the positions of the LED 84 and the photodetectors 85a, 85b also are varied significantly. This causes a variation in outer shape accuracy of the optical head 81.

Further, the LED 84 that serves as a light source is provided separately on the optical head 81. Thus, it is difficult to reduce the size and thickness of the optical head 81, and the assembly steps and the component cost are raised considerably.

The conventional tilt corrector is configured so that the whole optical head 81 is inclined with respect to the carrier 86. Therefore, the optical head 81 including the tilt corrector becomes larger in size, and thus it is difficult to reduce the size of the disk recording/reproducing apparatus. In addition, the responsiveness of tilt correction is degraded.

Thus, the tilt correction of the optical head 81 requires a waiting time for the system, so that a tilt cannot be detected in real time at high speed during recording or reproduction. Consequently, it is not possible to achieve tilt correction with excellent responsiveness.

DISCLOSURE OF INVENTION

With the foregoing in mind, it is an object of the present invention to provide an optical head that can detect a tilt without requiring a special light source for tilt detection, reduce both size and thickness, and correct the tilt with excellent responsiveness.

A first optical head of the present invention includes the following: a semiconductor laser; an objective lens for focusing a light beam from the semiconductor laser onto an information recording medium; a light beam separator that is located between the semiconductor laser and the objective lens, includes substantial interference regions for light that is reflected from the information recording medium and travels in a straight path and ±first-order diffracted light produced by information tracks of the information recording medium, and diffracts each of plural light beams in regions of the substantial interference regions, where the amount of light is changed by a change in the relative angle between the information recording medium and the objective lens and by a shift of the objective lens in the radial direction of the information recording medium; a light-receiving element that receives the light beam that is reflected by the information recording medium and separated by the light beam separator, and converts the light beam to an electrical signal; and an arithmetic circuit that corrects a value of the electrical signal detected by the light-receiving element in accordance with a radial position signal corresponding to the amount of shift of the objective lens in the radial direction of the information recording medium, and detects the relative angle between the information recording medium and the objective lens or the amount of tilt of the information recording medium with respect to a predetermined reference plane.

A second optical head of the present invention includes the following: a semiconductor laser; an objective lens for focusing a light beam from the semiconductor laser onto an information recording medium; a light beam reflection portion that reflects the light beam from the semiconductor laser and moves together with the objective lens; a light-receiving element that includes a light-receiving region for receiving the light beam reflected by the light beam reflection portion; and an arithmetic circuit that detects the amount of tilt of the objective lens with respect to a predetermined reference plane by using an electrical signal detected by the light-receiving element and a radial position signal corresponding to the amount of shift of the objective lens in the radial direction.

A third optical head of the present invention includes the following: a semiconductor laser; an objective lens for focusing a light beam from the semiconductor laser onto an information recording medium; a light beam separator that is located between the semiconductor laser and the objective lens and forms a plurality of light spots on the information recording medium; a light-receiving element that receives a light beam of each of the light spots reflected by the information recording medium, and converts received light to an electrical signal; and an arithmetic unit that calculates the electrical signal converted by the light-receiving element, and detects the relative angle between the information recording medium and the objective lens.

A fourth optical head of the present invention includes the following: a semiconductor laser for emitting divergent light; an objective lens for focusing the divergent light from the semiconductor laser onto an information recording medium; a light beam reflection portion that reflects a portion of a light beam traveling substantially outside an effective light beam diameter of the objective lens onto the information recording medium; a light-receiving element including at least two light-receiving portions, each of which receives the light beam that is reflected by the light beam reflection portion and then is reflected by the information recording medium; and an arithmetic unit that calculates the amount of light entering the light-receiving element, and detects the amount of tilt of the information recording medium with respect to a predetermined reference plane.

A fifth optical head of the present invention includes the following: a semiconductor laser for emitting divergent light; an objective lens for focusing the divergent light from the semiconductor laser onto an information recording medium; a collimator lens located between the semiconductor laser and the objective lens; a light beam reflection portion that reflects part of a light beam traveling substantially outside an effective light beam diameter of the objective lens or the collimator lens onto the information recording medium; a light-receiving element including at least two light-receiving portions, each of which receives the light beam that is reflected by the light beam reflection portion and then is reflected by the information recording medium; and an arithmetic unit that calculates the amount of light entering the light-receiving element, and detects the amount of tilt of the information recording medium with respect to a predetermined reference plane.

A sixth optical head of the present invention includes the following: a semiconductor laser; an objective lens for focusing a light beam from the semiconductor laser onto an information recording medium; an objective lens drive for driving the objective lens; a voltage controller for applying a voltage to the objective lens drive so that the objective lens is driven in a focusing direction; a light-receiving element that receives a light beam reflected from the information recording medium and produces a focusing error signal; and an arithmetic unit that detects a relative position of the information recording medium with respect to a predetermined reference position in the focusing direction, and calculates at least one selected from the relative angle between the information recording medium and the objective lens, the amount of tilt, the amount of warping, and the cross-sectional shape of the information recording medium by using a driving signal applied to the objective lens drive by the voltage controller and a focusing error signal produced by the light-receiving element.

BRIEF DESCRIPTION OF DRAWINGS

FIG. 1A is a plan view of an optical head in Embodiment 1.

FIG. 1B is a side view of the optical head in FIG. 1A.

FIG. 1C is a side view showing the vicinity of a central portion of a magneto-optical recording medium.

BEST MODE FOR CARRYING OUT THE INVENTION

Figure 2:
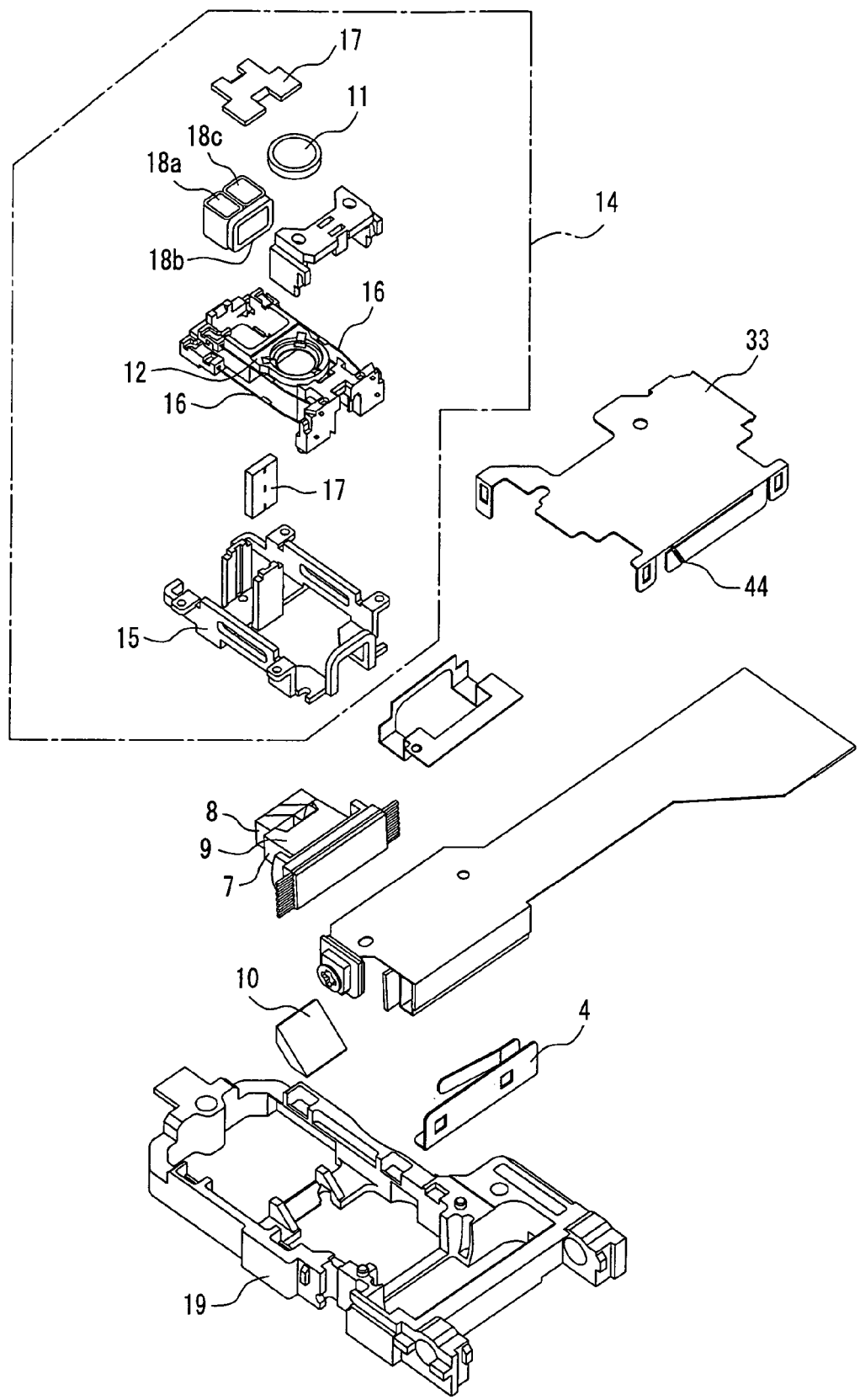
FIG. 2 is an exploded perspective view showing the configuration of a tilt detector of an optical head according to an embodiment of the present invention.

According to the first optical head of the present invention, the semiconductor laser for detecting information of the information recording medium also can be used as a light source for detecting a tilt of the information recording medium. Therefore, an additional light source for tilt detection is not necessary, and thus the size, thickness, and cost of the optical head can be reduced, resulting in a small thin low-cost disk recording/reproducing apparatus.

Moreover, the detection value is corrected using the radial position signal of the objective lens. Therefore, the amount of radial tilt can be detected with high precision, so that the disk recording/reproducing apparatus can achieve high performance and low power consumption. The amount of radial tilt also can be detected in real time during recording or reproduction. Thus, tilt detection and tilt correction can be performed at high speed with even higher performance.

According to the second optical head of the present invention, it is possible not only to detect a tilt of the objective lens but also to correct the amount of change in relative angle caused by the radial shift of the objective lens with a simple structure requiring fewer components. Therefore, the detection accuracy can be improved significantly.

According to the third optical head of the present invention, tilt detection can be performed based on a track pitch of the information recording medium with a simple structure.

According to the fourth optical head of the present invention, the semiconductor laser for detecting information of the information recording medium also can be used as a light source for detecting a tilt of the information recording medium. Therefore, an additional light source for tilt detection is not necessary, and thus the size, thickness, and cost of the optical head can be reduced, resulting in a small thin low-cost disk recording/reproducing apparatus. Moreover, tilt detection is performed using part of the light beam traveling outside the effective light beam diameter of the objective lens, so that power consumption can be reduced.

According to the fifth optical head of the present invention, the semiconductor laser for detecting information of the information recording medium also can be used as a light source for detecting a tilt of the information recording medium. Therefore, an additional light source for tilt detection is not necessary, and thus the size, thickness, and cost of the optical head can be reduced, resulting in a small thin low-cost disk recording/reproducing apparatus. Moreover, tilt detection is performed using part of the light beam traveling outside the effective light beam diameter of the collimator lens or the objective lens, so that power consumption can be reduced.

According to the sixth optical head of the present invention, the information about the height of a signal recording surface (light beam reflection surface) of the information recording medium from a reference position (e.g., the surface of a turntable on which the information recording medium is held) can be detected without performing focus servo or tracking servo. Moreover, a change in the relative angle between the information recording medium and the objective lens in the radial direction, the amount of radial tilt of the information recording medium with respect to a predetermined reference plane, or the amount of warping of the information recording medium also can be detected at high speed.

Although the amount of radial tilt cannot be detected in real time during recording or reproduction, this optical head does not require any components such as a light source, a light-receiving element, and a reflection mirror for tilt detection and thus can be made smaller and thinner. Moreover, a significant reduction in cost also can be achieved because no assembly step of a tilt detector is necessary.

Further, the optical head can correct a tilt at high speed by detecting the amount of tilt, warping, or shape of the information recording medium and performing learning control of the tilt correction in accordance with the radial position of the objective lens.

Each of the above optical heads uses a semiconductor laser whose variations in the emission point accuracy and the angle of divergence are smaller than those of a LED. Therefore, it is possible to reduce not only a variation in the amount of light detected by the light-receiving element, but also a variation in the detection sensitivity that is the ratio of the amount of change in tilt to the amount of light detected. Thus, a high-precision tilt detector can be achieved.

In the first optical head of the present invention, it is preferable that the light beam separator diffracts part of each of the light beams in the substantial interference regions. With this configuration, the amount of radial tilt of the information recording medium and the amount of radial shift of the objective lens can be detected with good sensitivity. Thus, high-precision tilt detection can be achieved.

It is preferable that the plural light beams are present in four regions of the light beam separator, the four regions are separated from each other by an axis in the radial direction and an axis in the tangential direction, and the two axes pass through a substantial center of the light that is reflected from the information recording medium and travels in a straight path. With this configuration, both radial and tangential tilts of the information recording medium can be detected precisely.

It is preferable that the optical head further includes an objective lens drive for driving the objective lens in the radial direction and the focusing direction, and that the radial position signal is calculated by using an applied current to drive the objective lens in the radial direction. With this configuration, the amount of radial shift of the objective lens can be detected easily without increasing the number of components.

It is preferable that the radial position signal is produced by calculating the amounts of light in at least two regions of the light beam separator, and the at least two regions are outside the substantial interference regions and are separated from each other by an axis in the tangential direction passing through a substantial center of the light that is reflected from the information recording medium and travels in a straight path. With this configuration, the amount of radial shift of the objective lens can be detected precisely.

It is preferable that the light beam separator is a hologram or a diffraction grating made of resin or glass. With this configuration, the number of components in the optical head can be reduced, which in turn reduces the cost of the optical head.

It is preferable that the light beam separator includes a $\lambda/4$ plate and a polarizing hologram that is located between the $\lambda/4$ plate and the semiconductor laser and has a diffraction effect only for a light beam of a predetermined polarization component, and the light-receiving element receives the light beam diffracted by the polarizing hologram. With this configuration, only the light beam reflected from the information recording medium can be diffracted, thus improving the light utilization efficiency.

It is preferable that the light beam separator is integrated with the objective lens and moved together with the objective lens in the focusing direction and the radial direction. With this configuration, even if the objective lens is shifted in the radial direction, the intensity distribution of light beams entering the light beam separator is not changed considerably. Thus, high-precision tilt detection can be achieved.

It is preferable that the optical head further includes a collimator lens between the objective lens and the semiconductor laser, and that the collimator lens is integrated with the light beam separator.

In the second optical head of the present invention, it is preferable that the light beam reflection portion is formed in an objective lens holder for holding the objective lens. With this configuration, the light beam reflection portion can be provided without increasing the number of components. The objective lens holder follows the shift of the objective lens, and thus can enhance the detection accuracy.

It is preferable that the optical head further includes an objective lens drive for adjusting the inclination angle of the objective lens and a second light-receiving element for receiving a light beam reflected by the information recording medium, and that the relative angle between the information recording medium and the objective lens is detected by using an electrical signal detected by the second light-receiving element and the electrical signal of the light-receiving element while adjusting the inclination angle of the objective lens by the objective lens drive. With this configuration, the relative angle between the information recording medium and the objective lens can be detected with a simple configuration.

It is preferable that the optical head further includes an objective lens drive for driving the objective lens in the radial direction and the focusing direction, and that the radial position signal is calculated by using an applied current to drive the objective lens in the radial direction. With this configuration, the amount of radial shift of the objective lens can be detected easily without increasing the number of components.

It is preferable that the radial position signal is produced by calculating the amounts of light in at least two regions of the light beam separator, and the at least two regions are outside substantial interference regions for light that is reflected from the information recording medium and travels in a straight path and ±first-order diffracted light produced by information tracks of the information recording medium and are separated from each other by an axis in the tangential direction passing through a substantial center of the light that is reflected from the information recording medium and travels in a straight path. With this configuration, the amount of radial shift of the objective lens can be detected precisely.

In the third optical head of the present invention, it is preferable that the optical head further includes an objective lens drive for driving the objective lens in the radial direction and the focusing direction, and that rotational adjustment of the light beam separator with respect to the information recording medium is performed by rotating the objective lens drive around a central axis of the objective lens, and an arrangement of the light spots on the information recording medium is adjusted by the rotational adjustment. With this configuration, it is possible to switch between the detection of a tilt only in the radial direction, the detection of a tilt only in the tangential direction, and the detection of tilts in both radial and tangential directions.

It is preferable that the light beam separator is a hologram or a diffraction grating. With this configuration, the number of components in the optical head can be reduced, which in turn reduces the cost of the optical head.

In the fourth optical head of the present invention, it is preferable that the optical head further includes an optical base for holding the semiconductor laser, and that the optical base is made of metal or resin, the light beam reflection portion is formed integrally with the optical base, and a light reflection film is formed on the light beam reflection portion. With this configuration, the light beam reflection portion can be provided easily and precisely.

It is preferable that the optical base is made of resin and formed integrally with the light beam reflection portion made of glass. With this configuration, the light beam reflection portion can be provided easily and precisely.

It is preferable that the light beam reflection portion is a light reflection film formed by deposition or application. With this configuration, the light beam reflection portion can be provided easily and precisely.

In the fifth optical head of the present invention, it is preferable that the light beam reflection portion is placed substantially outside an effective light beam diameter of the collimator lens and formed integrally near the exterior of the collimator lens. With this configuration, the light beam reflection portion can be provided easily, precisely, and at low cost without increasing the number of components.

It is preferable that the light beam reflection portion is formed by deposition, application, or coating of an aluminum reflection film or light reflection film near the exterior of the collimator lens. With this configuration, the light beam reflection portion can be provided easily, precisely, and at low cost without increasing the number of components.

In the sixth optical head of the present invention, it is preferable that the reference position is any one selected from a turntable for holding the information recording medium, part of the optical head, and a guide shaft of the optical head. With this configuration, the reference position accuracy can be stable.

It is preferable that the driving signal from the voltage controller is any one selected from a triangular wave, a sine wave, and a trapezoidal wave. With this configuration, a focusing error signal can be detected easily and precisely.

It is preferable that the arithmetic unit detects relative positions of the information recording medium with respect to the reference position in the focusing direction in at least two different portions of the information recording medium in the radial direction, and calculates at least one selected from the amount of tilt of the information recording medium, the relative angle between the information recording medium and the objective lens, the amount of warping and the cross-sectional shape of the information recording medium by using the relative positions.

It is preferable that at least one selected from the amount of tilt corresponding to the calculated radial position of the information recording medium, the relative angle between the information recording medium and the objective lens, the amount of warping and the cross-sectional shape of the information recording medium is stored in a memory, and a tilt correction signal is generated to change the relative angle between the objective lens and the information recording medium in accordance with the radial position by using information of the memory. With this configuration, high-speed tilt correction can be performed by a so-called learning effect.

Hereinafter, an embodiment of the present invention will be described with reference to the drawings.

Embodiment 1

FIG. 1 shows the configuration of an optical head in Embodiment 1 of the present invention. FIG. 1A is a plan view of the optical head, and FIG. 1B is a side view of the optical head in FIG. 1A. FIG. 1C is a side view showing the vicinity of a central portion of a magneto-optical recording medium.

Reference numeral 1 is a silicon substrate, 2 is a semiconductor laser that is fixed on the silicon substrate 1 and corresponds to a light source, 3 is a multisegment photodetector that is formed on the silicon substrate 1 by an IC process, and 4 is a thermal conductive plate that maintains the silicon substrate 1 in the state of heat conduction via silver paste.

Reference numeral 5 is a terminal that is connected to the multisegment photodetector 3 by wire bonding or the like, 6 is a resin package that holds the silicon substrate 1, the thermal conductive plate 4, and the terminal 5, 7 is a hologram element (diffraction grating) that is made of resin, 8 is a composite element that includes a beam splitter 8a, a bending mirror 8b, and a polarization separation element 8c.

In this configuration, the silicon substrate 1, the semiconductor laser 2, the multisegment photodetector 3, the thermal conductive plate 4, the terminal 5, the resin package 6, the hologram element 7, and the composite element 8 are formed integrally and defined as an integrated unit 9.

Reference numeral 10 is a reflecting mirror, 11 is an objective lens, and 13 is a magneto-optical recording medium with continuous lands and grooves having a magneto-optical effect. A diffraction grating (hologram element)

35 is located between the semiconductor laser 2 and the objective lens 11 and serves as a light beam separator.

FIG. 2 is an exploded perspective view of the optical head in FIG. 1. An objective lens drive 14 includes the objective lens 11, an objective lens holder 12 for securing the objective lens, a base 15, a suspension 16, a magnetic circuit 17, and coils 18a, 18b, and 18c. Reference numeral 19 is an optical base.

The objective lens 11 can be shifted in a focusing direction by allowing currents with the same value to flow through the coils 18a and 18c, and in a radial direction by allowing a current to flow through the coil 18b.

Moreover, when currents with different values flow through the coils 18a and 18c, the objective lens 11 can be rotated in a radial direction about the optical axis of the objective lens 11. Thus, it is possible to change the relative angle between the magneto-optical recording medium 13 and the objective lens 11 in the radial direction.

Figure 3:
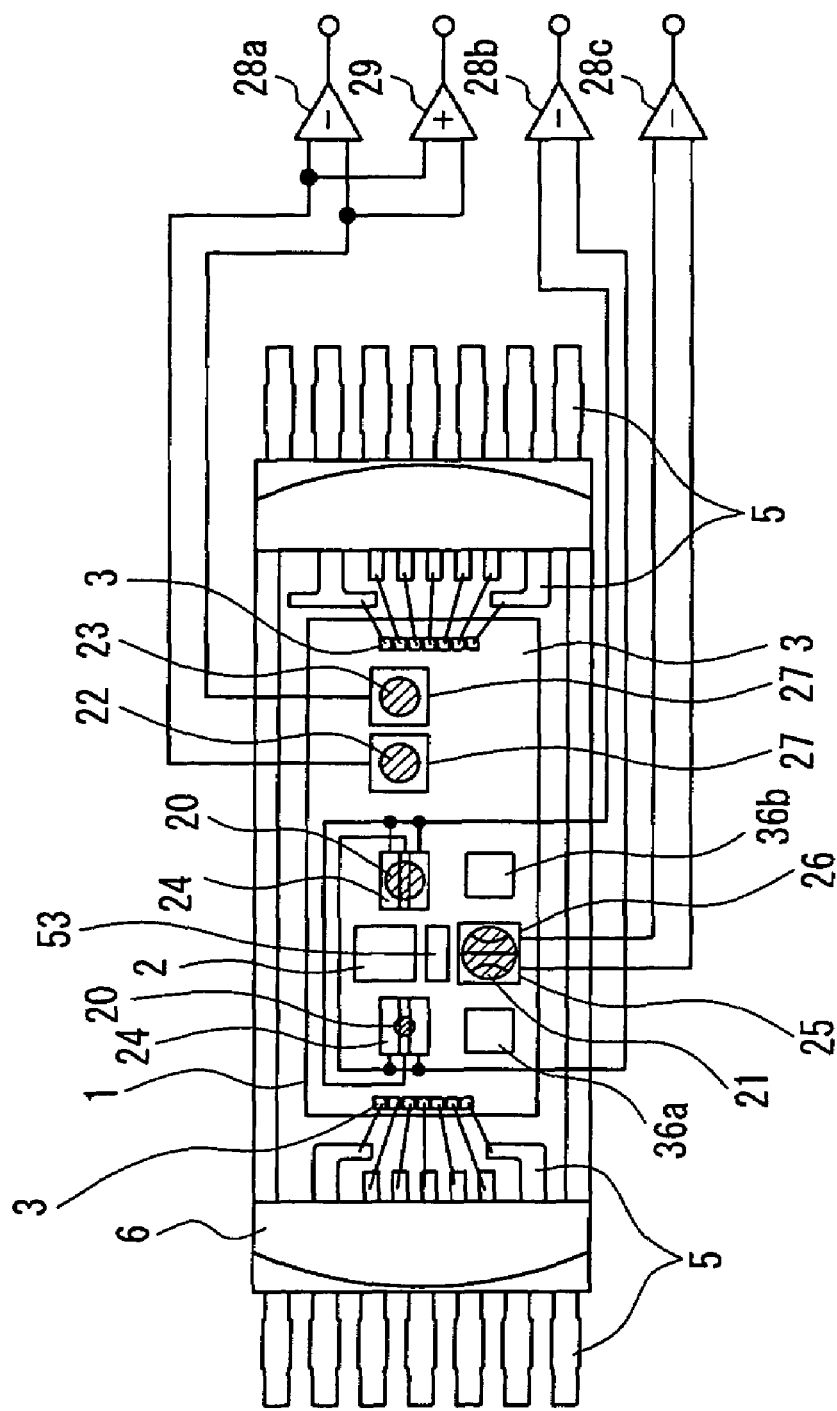
FIG. 3 is a plan view showing a light receiving/emitting element according to an embodiment of the present invention.

FIG. 3 is a plan view showing a light-receiving/emitting element of the optical head in FIG. 1. Reference numeral 20 is a light spot that is formed on the multisegment photodetector 3 and used for detecting a focusing error signal, and 21 is a light spot that is formed on the multisegment photodetector 3 and used for detecting a tracking error signal.

Reference numeral 22 is a main beam (P-polarized light) formed on the multisegment photodetector 3, 23 is a main beam (S-polarized light) formed on the multisegment photodetector 3, 24 is a focusing error signal light-receiving region, and 25 and 26 are tracking error signal light-receiving regions.

Reference numeral 27 is an information signal light-receiving region, and 28a, 28b, and 28c are subtracters. The subtracter 28a provides a magneto-optical disk signal, the subtracter 28b provides a focusing error signal, and the subtracter 28c provides a tracking error signal.

Reference numeral 29 is an adder that provides a prepit signal. As shown in FIG. 1, reference numeral 30 and 31 are focal points of a light spot for detecting a focusing error signal, and 32 is a light spot formed on the magneto-optical recording medium 13.

Each of the light-receiving regions includes a light-receiving element that converts the amount of light received to an electrical signal. The same is true for light-receiving regions in each of the following embodiments.

Figure 4:
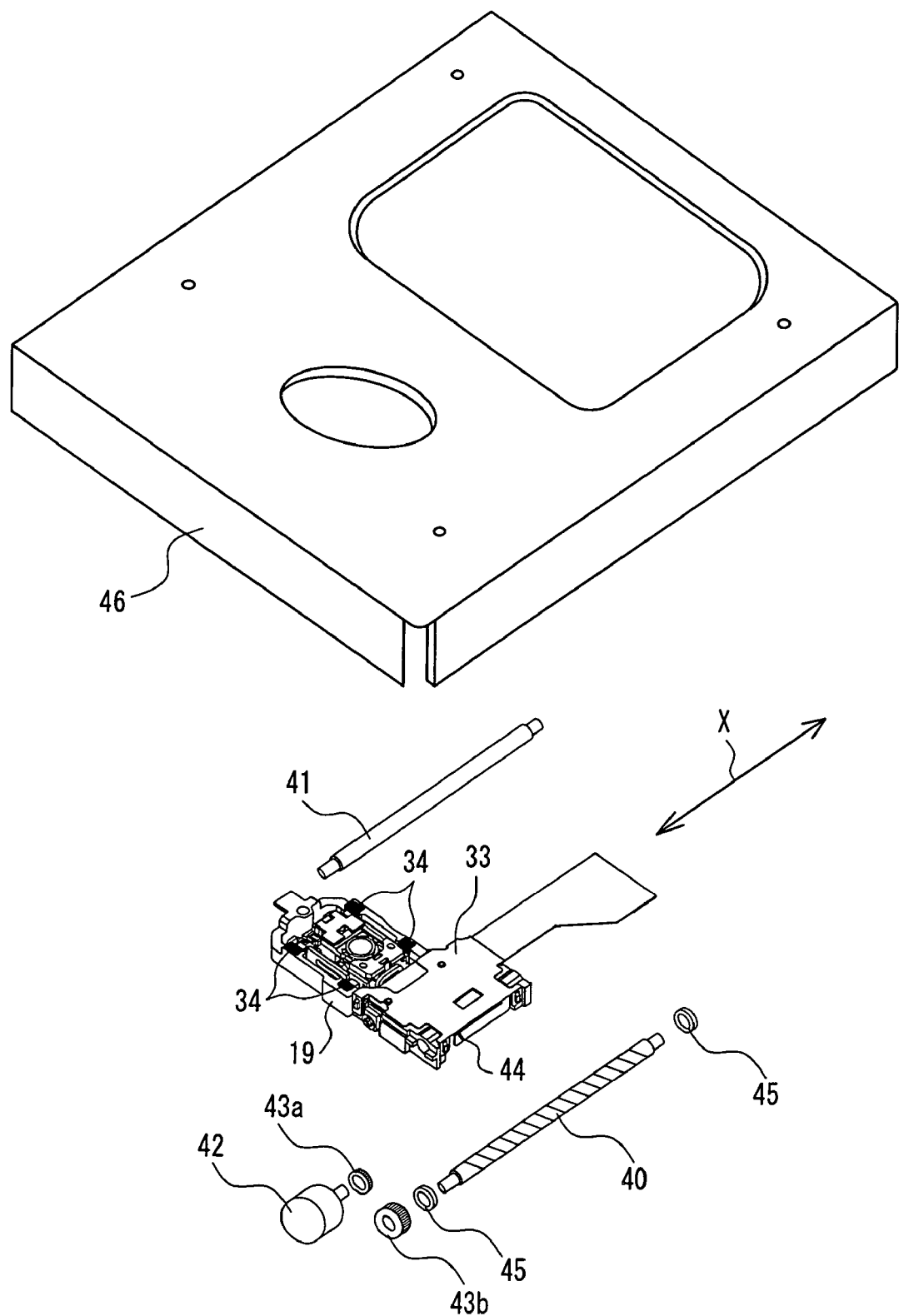
FIG. 4 is an exploded perspective view showing the relationship in operation between an optical head and an optical head feeder according to an embodiment of the present invention.

FIG. 4 is a perspective view showing the relationship in operation between the optical head and an optical head feeder in Embodiment 1 of the present invention. Reference numeral 33 is a cover, and 34 is an adhesive. The cover 33, the reflecting mirror 10, and the objective lens drive 14 as shown in FIG. 2 are fixed to the optical base 19 with the adhesive 34.

Figure 5:
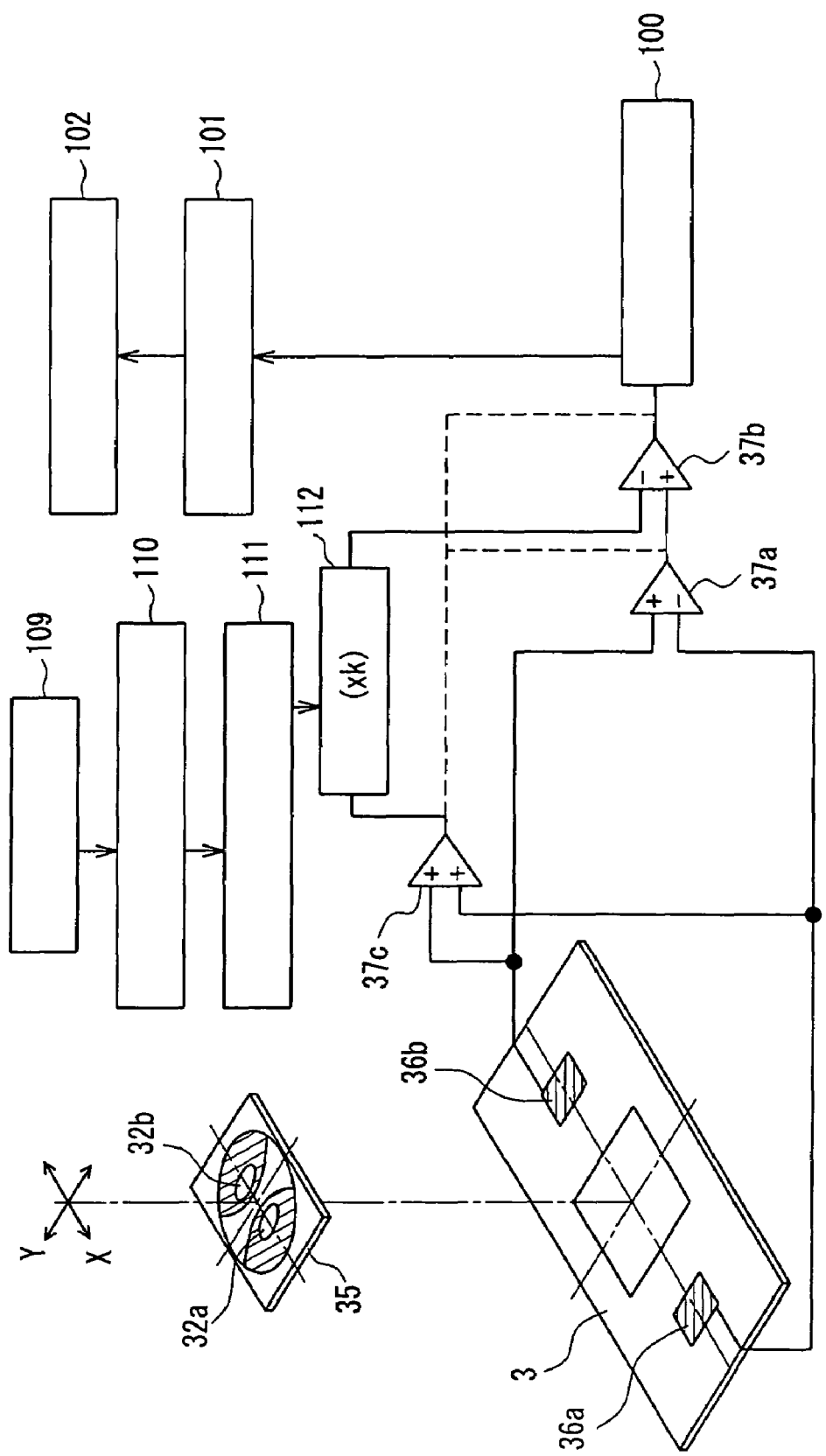
FIG. 5 includes an exploded perspective view showing the configuration of a tilt detector of the optical head in Embodiment 1 and a block diagram showing the process of outputting a tilt correction signal.

FIG. 5 includes an exploded perspective view showing the configuration of a tilt detector of the optical head in Embodiment 1 and a block diagram showing the process of outputting a tilt correction signal. The diffraction grating 35 diffracts each of the light beams in diffracted light beam regions 32a and 32b. The diffracted light beam regions 32a, 32b are part of substantial interference regions for light that is reflected from the magneto-optical recording medium 13 and travels in a straight path and ±first-order diffracted light produced by the information tracks.

These diffracted light beams pass through the beam splitter 8a (FIG. 1) and enter light-receiving regions 36a and 36b formed on the multisegment photodetector 3. The diffraction grating 35 is incorporated into the objective lens drive 14 (FIG. 2) and moves together with the objective lens 11 in both focusing and radial directions. The tilt correction will be described in detail later.

Next, the optical arrangement of the optical head in view of a servo signal will be described by referring to the drawings. The initial position of a focusing error signal can be set in the following manner. The resin package 6 of the integrated unit 9 is fixed to the optical base 19 (FIG. 2) so that the position of the multisegment photodetector 3 is adjusted in the Z-axis (optical axis) direction of FIG. 1 to allow the focusing error signal light-receiving regions 24 (FIG. 3) to be almost midway between the focal points 30 and 31 (FIG. 1) of a light spot.

Figure 6A:
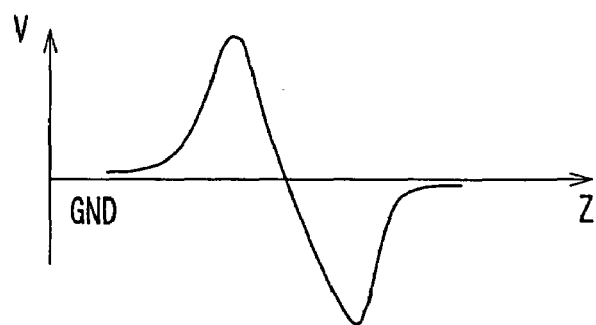
FIG. 6A shows the state in which the substantial center of a focusing error signal coincides with GND.
Figure 6B:
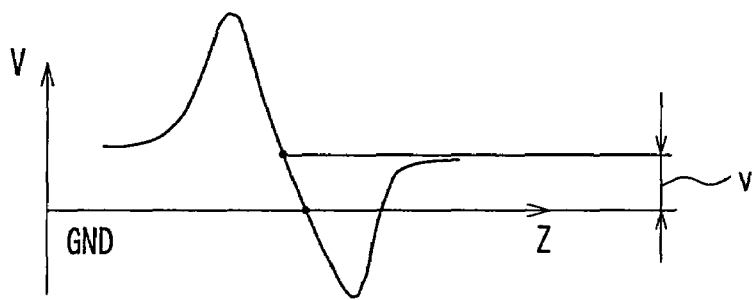
FIG. 6B shows the state in which the substantial center of a focusing error signal is displaced from GND.

FIG. 6 shows focus servo of the optical head. In FIGS. 6A and 6B, a horizontal axis Z represents a relative distance between the magneto-optical recording medium 13 and the objective lens 11, and a vertical axis V represents a voltage (distance). FIG. 6A shows the state in which the substantial center of a focusing error signal (so-called "S-shaped signal") coincides with GND. FIG. 6B shows the state in which the substantial center of a focusing error signal is displaced from GND.

The semiconductor laser 2 is fixed precisely to the integrated unit 9. Therefore, when the magneto-optical recording medium 13 and the objective lens 11 are at the normal positions (design center) in the Z-axis (optical axis) direction, the substantial center of the focusing error signal (so-called "S-shaped signal") coincides with GND, as shown in FIG. 6A.

Figure 6C:
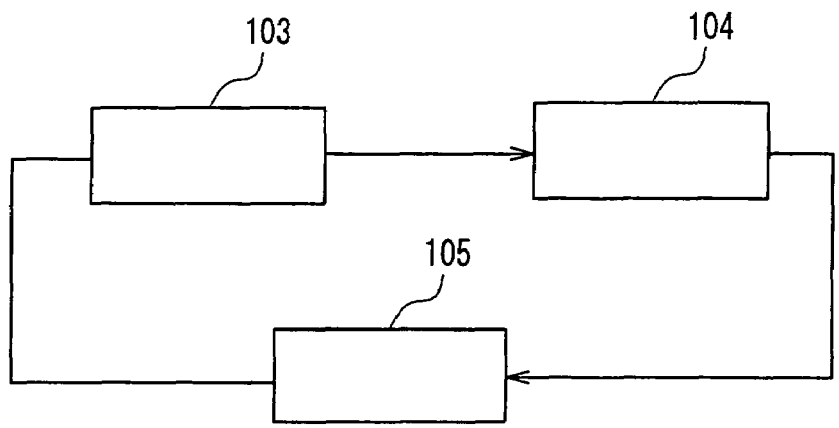
FIG. 6C is a block diagram showing focus servo according to an embodiment of the present invention.

FIG. 6C is a block diagram of the focus servo when the substantial center of the focusing error signal is displaced from GND, as shown in FIG. 6B. Specifically, the amount of defocus from GND is calculated using a focusing error signal that has been detected by a SSD system (step 103), an offset current (voltage) is determined according to the amount of defocus (step 104), and a current corresponding to the amount of offset is applied to the coils 18a and 18c (step 105), thereby converging near GND. The amount of defocus from GND is represented by v in FIG. 6B, which is a value between the horizontal axis and the center of the S-shaped signal.

Figure 7A:
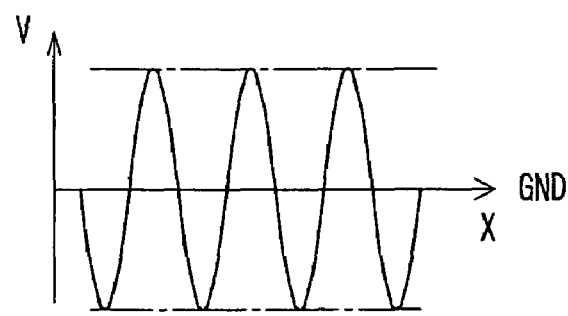
FIG. 7A shows the state in which the substantial center of a tracking error signal coincides with GND.
Figure 7B:
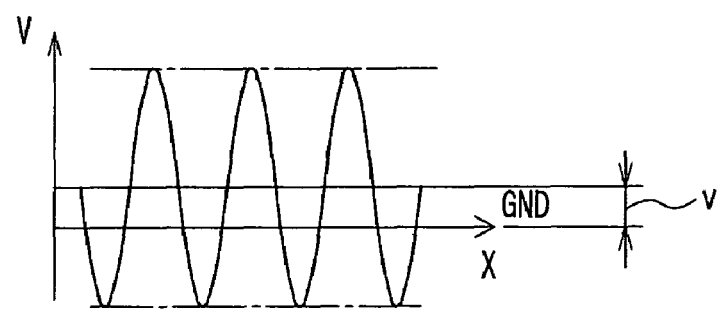
FIG. 7B shows the state in which the substantial center of a tracking error signal is displaced from GND.

FIG. 7 shows tracking servo of the optical head in Embodiment 1 of the present invention. In FIGS. 7A and 7B, a vertical axis V represents a voltage (the amount of offtrack), and a horizontal axis X represents a radial position. FIG. 7A shows the state in which the substantial center of a tracking error signal coincides with GND. FIG. 7B shows the state in which the substantial center of a tracking error signal is displaced from GND.

The tracking error signal is adjusted by a so-called push-pull method. Specifically, the object lens drive 14 (FIG. 2) is moved in the X (radial) and Y (tangential) directions while holding the optical base 19 (FIG. 4) with an external jig (not shown). By this movement, the outputs of the tracking error signal light-receiving regions 25, 26 (FIG. 3) are adjusted to be substantially uniform. Thus, the tracking servo is converged on an intersection point of the tracking error signal and GND.

Figure 7C:
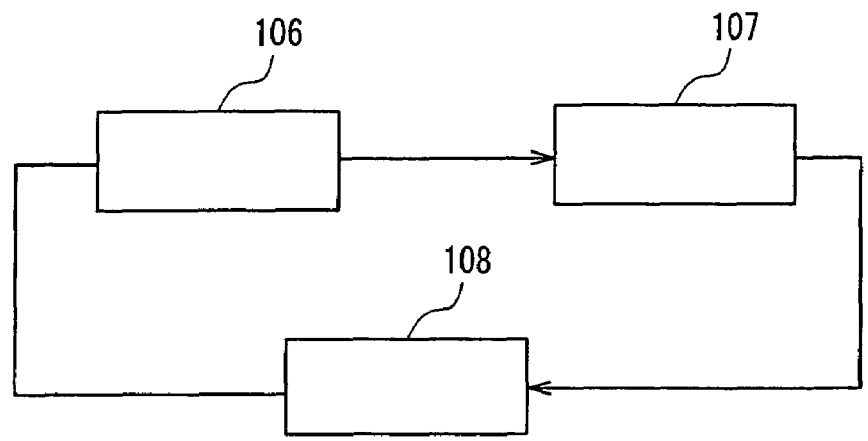
FIG. 7C is a block diagram showing tracking servo according to an embodiment of the present invention.

As shown in a block diagram of FIG. 7C, the amount of offtrack from GND is calculated using the detected tracking error signal (step 106), an offtrack current is determined according to the amount of offtrack (step 107), and a current corresponding to the amount of offtrack is applied to the coil 18b (step 108), thereby converging near GND. The amount of offtrack is represented by v in FIG. 7B, which is a value between the horizontal axis and the center of the S-shaped signal.

Consequently, this adjustment allows the center of the objective lens 11 to be aligned with the center of the luminous axis of the semiconductor laser 2 in FIG. 1.

Figure 8B:
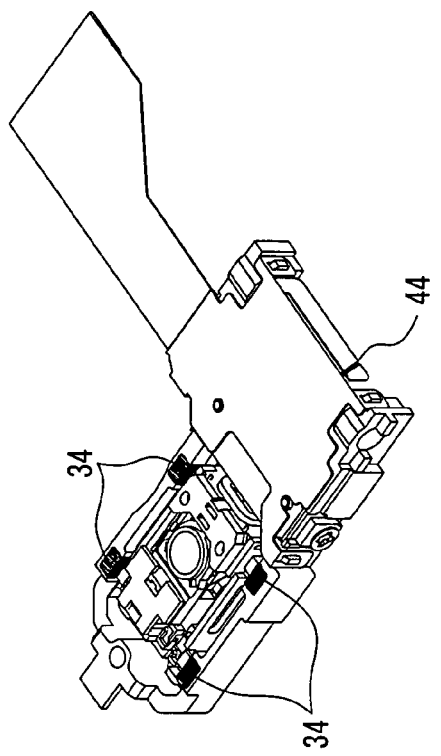
FIG. 8B is a perspective view after assembling each of the configurations in FIG. 8A.
Figure 8A:
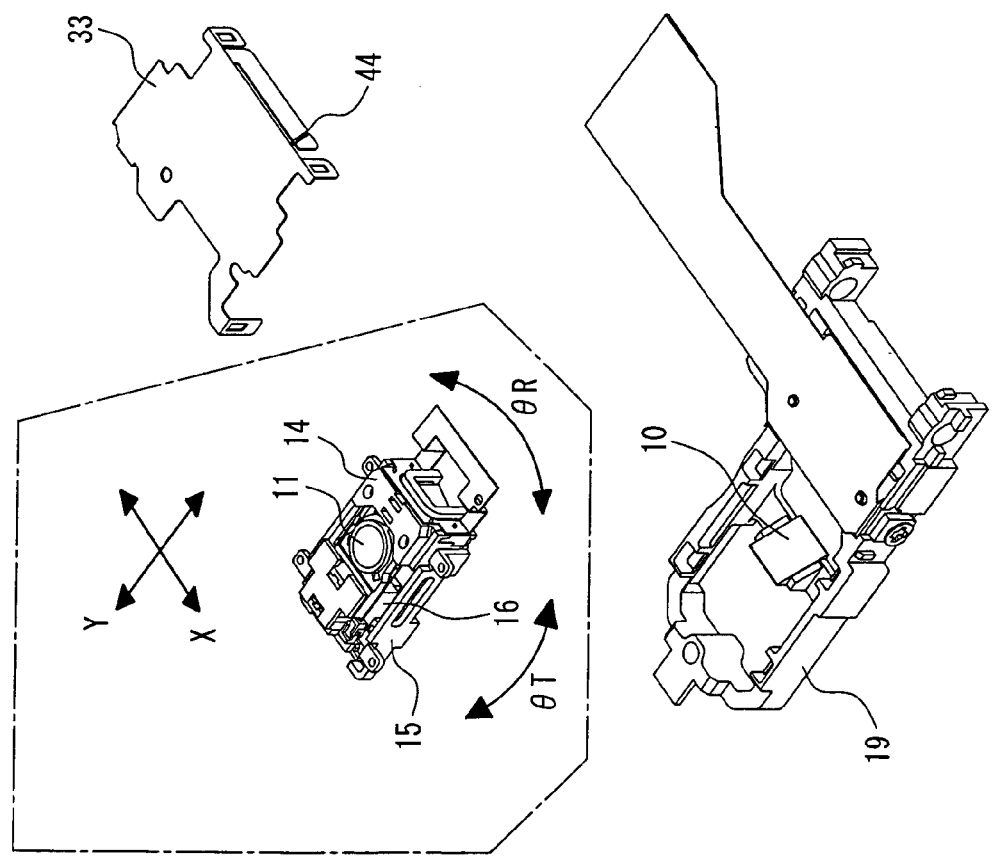
FIG. 8A is an exploded perspective view showing a way of adjusting an optical head according to an embodiment of the present invention.

Next, adjustment (tilt adjustment) of the relative inclination between the magneto-optical recording medium 13 and the objective lens 11 will be described by referring to FIG. 8. FIG. 8A is an exploded perspective view showing a way of adjusting the optical head. FIG. 8B is a perspective view after assembly.

As shown in FIG. 8A, the tilt adjustment can be performed by radial tilt adjustment (around the Y axis) θR and tangential tilt adjustment (around the X axis) θT while holding the base 15 with an external jig (not shown). After making the adjustment, the base 15 is bonded to the optical base 19 with an adhesive 34, as shown in FIG. 8B.

With these processes, the adjustments of a focusing error signal, tracking error signal, and skew are finished, thereby completing an optical head.

The optical head feeder moves the whole optical head in the radial direction (X direction) of the magneto-optical recording medium 13. As shown in FIG. 4, the optical head feeder includes a feed screw 40, a jackshaft 41, a feed motor 42, gears 43a and 43b, a cover 33 provided with a nut plate 44, and a bearing 45. The optical head feeder is attached to a mechanical base 46 (the details of attachment is not shown).

As shown in FIG. 1C, a turntable 47 holds the magneto-optical recording medium 13 on the holding surface at a predetermined height (position in the optical axis direction).

In this condition, when the feed screw 40 is engaged with the nut plate 44, and the feed motor 42 is rotated, the whole optical head is moved in the radial direction by a feed amount that is determined based on a gear ratio of the gear 43a to the gear 43b and a speed reducing ratio calculated using a pitch of the feed screw 40.

In this case, the relative position between the objective lens 11 and the optical base 19 is obtained by subtracting the feed amount of the optical head in the radial direction from the amount of shift of the objective lens 11 in the radial direction. The amount of shift (radial movement) of the objective lens 11 is the maximum immediately before rotating the feed motor 42 (see FIG. 9).

The shift of the objective lens 11 from the inner to the outer circumference of the magneto-optical recording medium 13 during recording or reproduction will be described by referring to FIGS. 4 and 9.

Figure 9A:
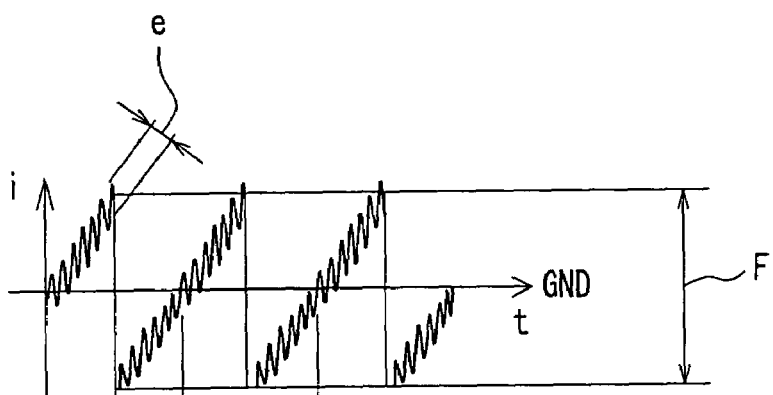
FIG. 9A shows a driving waveform of an objective lens drive according to an embodiment of the present invention.
Figure 9B:
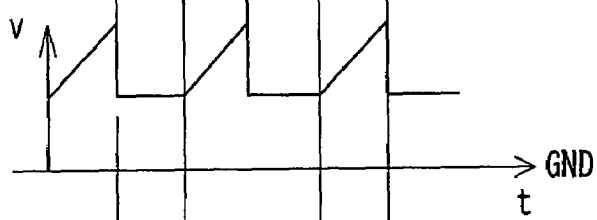
FIG. 9B shows a driving voltage waveform of a feed motor according to an embodiment of the present invention.
Figure 9C:
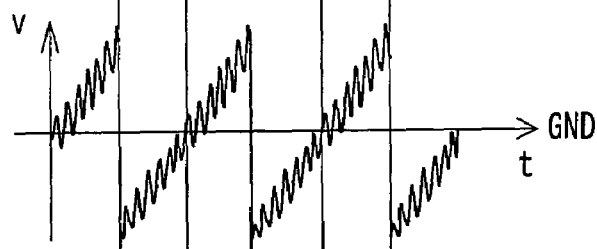
FIG. 9C shows a radial shift waveform of an objective lens according to an embodiment of the present invention.

FIG. 9A shows a driving waveform of the objective lens drive 14. In FIG. 9A, a vertical axis i represents an applied current (or applied voltage) to the coil 18b, and a horizontal axis t represents time (or the amount of shift of the objective lens 11). FIG. 9B shows a driving voltage waveform of the feed motor 42. In FIG. 9B, a vertical axis v represents an applied voltage to the feed motor 42, and a horizontal axis t represents time. FIG. 9C shows a radial shift waveform of the objective lens 11. In FIG. 9C, a vertical axis v represents the amount of voltage (or the amount of shift (μm)), and a horizontal axis t represents time (or the amount of shift of the objective lens 11).

First, the objective lens 11 is shifted in the radial direction so that the substantial center of the objective lens 11 is located near the design optical axis 50 (FIG. 1) and follows the tracks of the magneto-optical recording medium 13 (FIG. 9A). This radial shift of the objective lens 11 can be performed by applying a current to the coil 18b.

As shown in FIG. 9A, a DC component of a current value of the coil 18b is increased as the objective lens 11 is shifted toward the outer circumference, while the magneto-optical recording medium 13 has an eccentric component e. The feed amount F is an amount between the lower limit and the upper limit of the current value of the coil 18b.

At the same time, a voltage that corresponds to the current value applied to the coil 18b is applied to the feed motor 42 (FIG. 9B). When this voltage reaches a predetermined value, the feed motor 42 is rotated to provide a feed amount of the optical head in accordance with the gear ratio that is determined by the gears 43a, 43b and the feed screw 40. Thus, the whole optical base 19 is driven in the outer circumference direction (radial direction) (FIG. 9C).

The configuration and operation of the optical head as described using FIGS. 1 to 9 are the same as in the following embodiments except for the configuration of the tilt detector in FIG. 5.

Embodiment 1 with the above configuration will be described in more detail by referring to the drawings. Light emitted from the semiconductor laser 2 is separated into a plurality of different light beams by the hologram element 7. The plurality of different light beams pass through the beam splitter 8a of the composite element 8, are reflected by the reflecting mirror 10, and enter the diffraction grating 35. The diffraction grating 35 separates the incident light into a plurality of light beams, and light traveling in a straight path (zeroth-order light) is focused on the magneto-optical recording medium 13 to form a light spot 32 having a diameter of about 1 micron by the objective lens 11 that is secured to the objective lens holder 12.

A light beam reflected from the beam splitter 8a of the composite element 8 enters a light-receiving element for a laser monitor (not shown) and controls a driving current of the semiconductor laser 2.

Reflected light from the magneto-optical recording medium 13 goes back along the opposite path, is reflected and divided by the beam splitter 8a of the composite element 8, and enters the bending mirror 8b and the polarization and separation element 8c.

The semiconductor laser 2 is placed in the polarization direction (W) parallel to the sheet of the drawing in FIG. 1A. The incident light is separated into two light beams of polarization components that are perpendicular to each other by the polarization and separation element 8c. Then, the two light beams enter the information signal light-receiving regions 27 (FIG. 3). When a difference between the main beam 22 (P-polarized light) and the main beam 23 (S-polarized light) is calculated as shown in FIG. 3, a magneto-optical disk information signal can be detected by a differential detection method. Moreover, a prepit signal can be detected by finding the sum of the main beams.

The light beam that is reflected from the magneto-optical recording medium 13 and passes through the beam splitter 8a is separated into a plurality of light beams by the hologram element 7. The separated light beams are condensed in the focusing error signal light-receiving regions 24 and the tracking error signal light-receiving regions 25 and 26, as shown in FIG. 3. The focus servo is performed by a so-called SSD method, and the tracking servo is performed by a so-called push-pull method.

As shown in FIG. 5, the diffraction grating (light beam separator) 35 includes two regions where light that is reflected from the magneto-optical recording medium 13 and travels in a straight path interferes with ±first-order light that is diffracted by the continuous grooves of the magneto-optical recording medium 13, and diffracts each of the light beams in the diffracted light beam regions 32a and 32b of the two regions.

After passing through the beam splitter 8a, the two diffracted light beams travel outside the hologram element 7 (a portion of the light beams may be diffracted by the hologram element 7) and enter the light-receiving regions 36a and 36b, each having a light-receiving element.

FIGS. 10A to 10D show light beam distributions on the diffraction grating 35. Reference numeral 90 is a zeroth-order light region, 91 is a +first-order light region, and 92 is a −first-order light region. In the region 91, the zeroth-order light interferes with the +first-order light. In the region 92, the zeroth-order light interferes with the −first-order light.

Figure 10A:
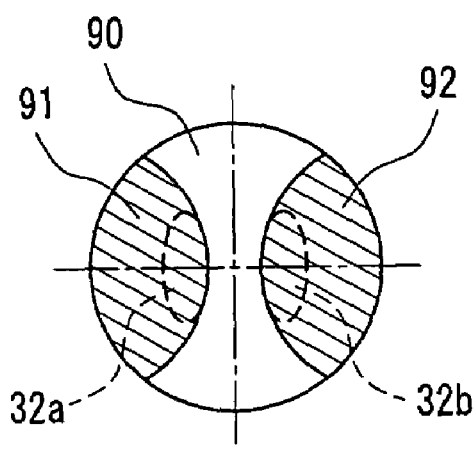
FIG. 10A shows a light beam distribution in the absence of tilt and shift according to an embodiment of the present invention.

FIG. 10A shows a light beam distribution when the amount of shift of the objective lens 11 in the radial direction is small (substantially zero), and an error in the relative angle between the objective lens 11 and the magneto-optical recording medium 13 in the radial direction (or a radial tilt of the magneto-optical recording medium 13 with respect to a predetermined reference plane) is small (substantially zero).

In this case, the amount of light in the diffracted light beam region 32a is about the same as that in the diffracted light beam region 32b. Thus, the amounts of light entering the light-receiving regions 36a and 36b in FIG. 5 also are about the same.

Figure 10B:
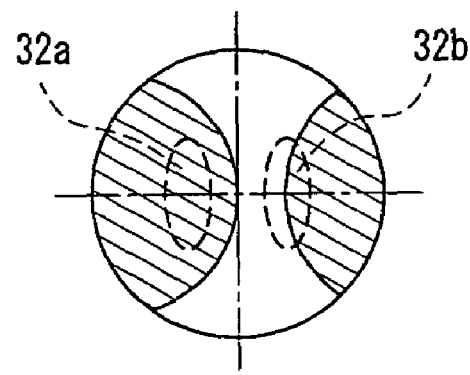
FIG. 10B shows a light beam distribution in the presence of radial shift according to an embodiment of the present invention.

FIG. 10B shows a light beam distribution when the objective lens 11 is shifted in the radial direction from the state in FIG. 10A. For shift, the light beam distribution indicates a radial shift, and not a tangential shift. For tilt, the light beam distribution indicates neither a radial tilt nor a tangential tilt.

In this case, the amount of light in the diffracted light beam region 32a is reduced, and the amount of light in the diffracted light beam region 32b is increased as compared with the state in FIG. 10A. Thus, the amounts of light entering the light-receiving regions 36a and 36b also vary accordingly. Therefore, there is a correlation between the output of a differential amplifier 37a and the amount of shift of the objective lens 11 in the radial direction.

By calculating a DC current value of the coil 18b (FIG. 2) of the objective lens drive 14, the amount of shift of the objective lens 11 can be detected (the direction of a change (or sign) is reversed depending on whether the radial shift of the objective lens 11 is toward the inner or the outer circumference). In other words, the amount of shift of the objective lens 11 can be detected independently from the light beam distribution on the diffraction grating 35.

Based on the relationship between the amount of shift of the objective lens 11 and the output of the differential amplifier 37a in FIG. 5, it is possible to calculate an output value of the differential amplifier 37a that corresponds to the amount of radial shift.

Therefore, a change in output component of the differential amplifier 37a caused by the amount of shift of the objective lens 11 in the radial direction is corrected using a correction value that corresponds to the amount of shift of the objective lens 11 calculated from the DC current value of the coil 18b. Thus, any change in the differential amplifier 37a due to a radial shift of the objective lens 11 can be canceled.

Although the amounts of light entering the light-receiving regions 36a and 36b vary when the state in FIG. 10A is changed to the state in FIG. 10B, an output value of the differential amplifier 37b in FIG. 5 can be made zero by the above cancellation.

Figure 10C:
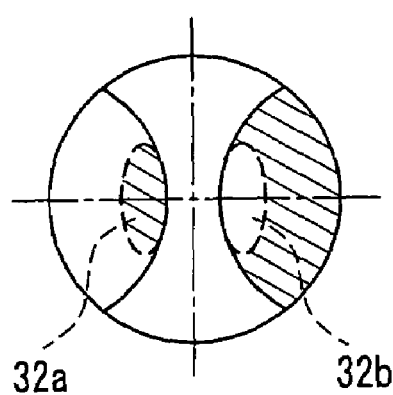
FIG. 10C shows a light beam distribution in the presence of radial tilt according to an embodiment of the present invention.

FIG. 10C shows a light beam distribution when a tilt occurs. For tilt, the light beam distribution indicates a radial tilt, and not a tangential tilt. For shift, the light beam distribution indicates neither a radial shift nor a tangential shift.

Specifically, while there is almost no shift of the objective lens 11, a radial tilt of the magneto-optical recording medium 13 with respect to a predetermined reference plane (e.g., the surface of the turntable on which the magneto-optical recording medium 13 is held) occurs, or the relative angle between the magneto-optical recording medium 13 and the objective lens 11 is changed.

In this case, the amount of light in the diffracted light beam region 32a is reduced, and the amount of light in the diffracted light beam region 32b is increased because of interference between the zeroth-order light and the ±first-order light. Thus, the amounts of light entering the light-receiving regions 36a and 36b also vary accordingly.

Compared to the state in FIG. 10A, the output values of the differential amplifiers 37a, 37b are changed. Since there is no shift of the objective lens 11, such a change is caused only by a tilt of the magneto-optical recording medium 13. When the angle of a radial tilt is reversed, changes in the light-receiving regions 36a and 36b also are reversed.

When not only a radial shift of the objective lens 11 but also a radial tilt of the magneto-optical recording medium 13 occurs, the amounts of light in the diffracted light beam regions 32a and 32b are changed further, and thus the amounts of light entering the light-receiving regions 36a and 36b also vary accordingly. In this case, a variation in the amount of light entering the light-receiving regions 36a, 36b that corresponds to the radial shift can be calculated independently using the DC current value (or voltage value) of the coil 18b as described above.

Therefore, when a variation in the amount of light corresponding to the radial shift is subtracted from a variation in the amount of light entering the light-receiving regions 36a, 36b, a variation in the amount of light corresponding to the radial tilt can be obtained.

Thus, in a region on the diffraction grating 35 where the amount of light is changed only by a shift, such a change cannot be used to calculate the amount of tilt. However, in a region on the diffraction grating 35 where the amount of light is changed by both shift and tilt, such a change is detected to calculate a change in the amount of light corresponding to the amount of tilt, since a change in the amount of light due to the shift can be calculated separately.

Therefore, even if both shift and tilt occur, the amount tilt of the magneto-optical recording medium 13 can be obtained precisely.

Hereinafter, tilt control will be described by referring to the block diagram of FIG. 5. The DC current value of the coil 18b is detected (step 109), and the amount of shift of the objective lens 11 in the radial direction is calculated by an arithmetic circuit (step 110). Then, the arithmetic circuit outputs a signal (voltage) in accordance with the amount of radial shift (step 111). Using this output and the output of an amplifier 37c that corresponds to the sum of the amounts of light entering the light-receiving regions 36a and 36b, a gain (xk) is determined to calculate a correction value (step 112). The differential amplifier 37b outputs a difference between the output of the differential amplifier 37a and the correction value.

The arithmetic circuit performs a calculation with the output value of the differential amplifier 37b (step 100). Thus, the amount of tilt of the magneto-optical recording medium 13 can be obtained precisely.

Moreover, the arithmetic circuit calculates a tilt correction signal for canceling the tilt (step 101) and sends it to a driving circuit. Upon receiving the tilt correction signal, the driving circuit drives the coils 18a, 18c (step 102), thereby controlling the tilt of the magneto-optical recording medium 13.

In this case, an error in the detection sensitivity due to the amounts of light entering the light-receiving regions 36a and 36b can be corrected in the following manner: (a) the calculated value of the amount of tilt is divided by a total signal after the summing amplifier 37c adding the amounts of light received by the light-receiving regions 36a and 36b in the absence of tilt of the magneto-optical recording medium 13 and shift of the objective lens 11 (or in the presence of shift and tilt); or (b) when the amount of shift calculated from the current value of the coil 18b is used to determine a correction value, the amount of shift is divided by the total signal.

As shown in a broken line of the block diagram of FIG. 5, the error in the detection sensitivity due to the amounts of light entering the light-receiving regions 36a and 36b also can be corrected by dividing the output of the differential amplifier 37b or 37a by the output of the summing amplifier 37c.

When the amount of tilt correction corresponding to the amount of radial tilt that has been calculated by the arithmetic circuit is output to the driving circuit (the step 102 in FIG. 5) and then is applied to the coils 18a and 18c of the objective lens drive 14, the relative angle between the objective lens 11 and the magneto-optical recording medium 13 can be corrected at high speed. This is because the current values of the coils 18a, 18c are changed so as to change a driving force in the focusing direction, which generates a radial tilt.

Figure 10D:
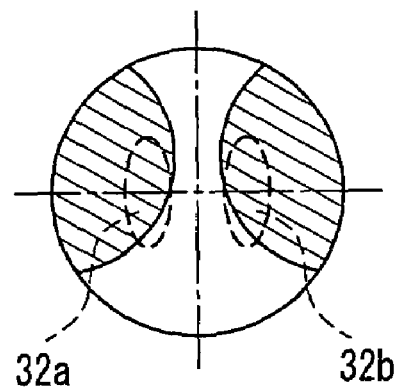
FIG. 10D shows a light beam distribution in the presence of tangential tilt according to an embodiment of the present invention.

FIG. 10D shows a light beam distribution when only a tangential tilt occurs. For tilt, the light beam distribution indicates a tangential tilt, and not a radial tilt. For shift, the light beam distribution indicates neither a radial shift nor a tangential shift.

When a tangential tilt occurs, the interference pattern deviates in the longitudinal direction of the sheet of the drawing. In the example of FIG. 10D, the interference pattern deviates upward. Therefore, a light beam is divided into upper and lower portions, and the respective light beams are received, thereby detecting a tangential tilt. This will be described in detail in Embodiment 2.

Figure 11:
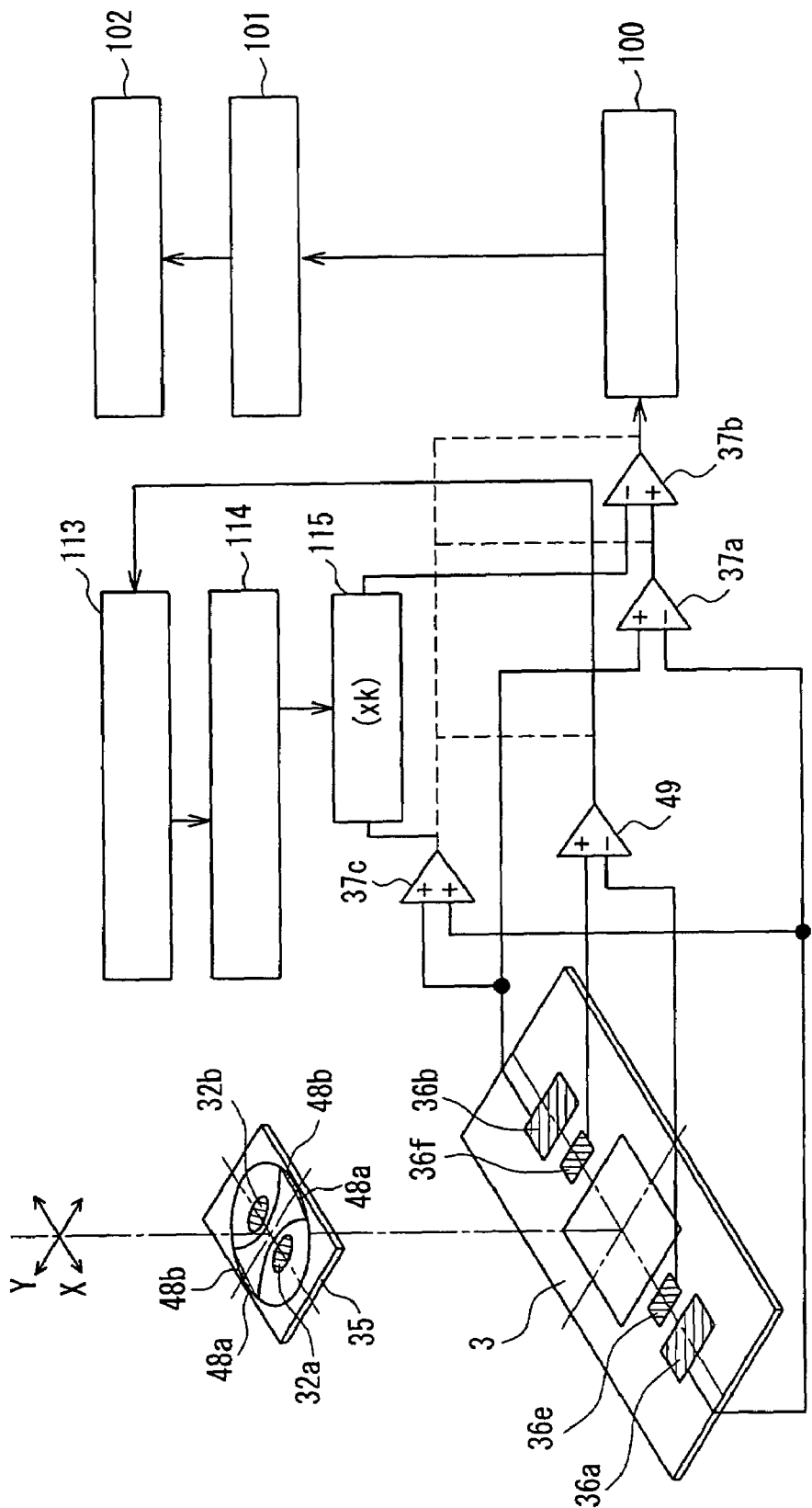
FIG. 11 includes an exploded perspective view showing a tilt detector according to an embodiment of the present invention and a block diagram showing the process of outputting a tilt correction signal.

Next, FIG. 11 includes an exploded perspective view showing another example of a tilt detector of the optical head in Embodiment 1 and a block diagram showing the process of outputting a tilt correction signal. In the above example, the amount of radial shift is determined by calculating a radial position signal corresponding to the amount of shift of the objective lens in the radial direction from the DC current value of the coil 18b. In the example of FIG. 11, the amount of radial shift is calculated by the output of a differential amplifier 49 for light-receiving regions 36e and 36f. The light-receiving regions 36e and 36f receive light beams that have passed through light beam regions 48a and 48b where the ±first-order light has less effect on a push-pull signal, respectively.

Specifically, as shown in FIG. 11, the amount of shift of the objective lens 11 in the radial direction is calculated by an arithmetic circuit using the output of the differential amplifier 49 that results from a difference between the amounts of light entering the light-receiving regions 36e and 36f (step 113). Then, the arithmetic circuit outputs a signal (voltage) in accordance with the amount of radial shift (step 114). Using this output and the output of the amplifier 37c that corresponds to the sum of the amounts of light entering the light-receiving regions 36a and 36b, a gain (xk) is determined to calculate a correction value (step 115). The differential amplifier 37b outputs a difference between the output of the differential amplifier 37a and the correction value. The subsequent steps 100, 101, and 102 are the same as those in FIG. 5.

Like FIG. 5, a broken line of the block diagram of FIG. 11 shows a configuration for correcting an error in the detection sensitivity due to the amounts of light entering the light-receiving regions.

Moreover, an offset value of the push-pull signal may be used to calculate the amount of radial shift.

As described above, the relative angle between the objective lens 11 and the magneto-optical recording medium 13 can be detected with high precision in Embodiment 1. Therefore, the degradation of a reproduction signal and a servo signal that is caused by the amount of shift of the objective lens 11 in the radial direction can be improved significantly. Thus, it is possible further to increase the recording and reproducing performance of an optical head and a disk recording/reproducing apparatus.

Moreover, a current value corresponding to the relative angle is calculated and applied to the coils 18a and 18c, so that an error in the relative angle between the objective lens 11 and the magneto-optical recording medium 13 can be corrected in real time at high speed. This can provide the optical head with a high-precision tilt detector and tilt corrector.

Moreover, a special light source for tilt detection is not necessary, and thus the size, thickness, and cost of the optical head and the disk recording/reproducing apparatus can be reduced.

In this embodiment, the diffraction grating 35 is moved together with the objective lens 11 in the radial direction. However, the diffraction grating 35 may be located between the objective lens 11 and the semiconductor laser 2 and not be integrated with the objective lens 11. When the optical configuration is a so-called infinite optical system including a collimator lens, the diffraction grating 35 may be integrated with the collimator lens.

In this embodiment, the magneto-optical recording medium 13 is used as an information recording medium. However, a phase change medium or ROM disk having a prepit also can be used.

Moreover, light beams passing through the beam splitter 8a are used for tilt detection. However, light beams that have been reflected by the beam splitter 8a and the bending mirror 8b also can be used.

Further, two light beams are diffracted by the diffraction grating 35. However, the diffraction grating 35 may diffract three or more light beams. In this case, the tilt detection can be performed by calculating a difference between the sum of the amounts of light diffracted in the interference region of light that is reflected and travels in a straight path and +first-order diffracted light and the sum of the amounts of light diffracted in the interference region of light that is reflected and travels in a straight path and −first-order diffracted light.

Embodiment 2

Figure 12:
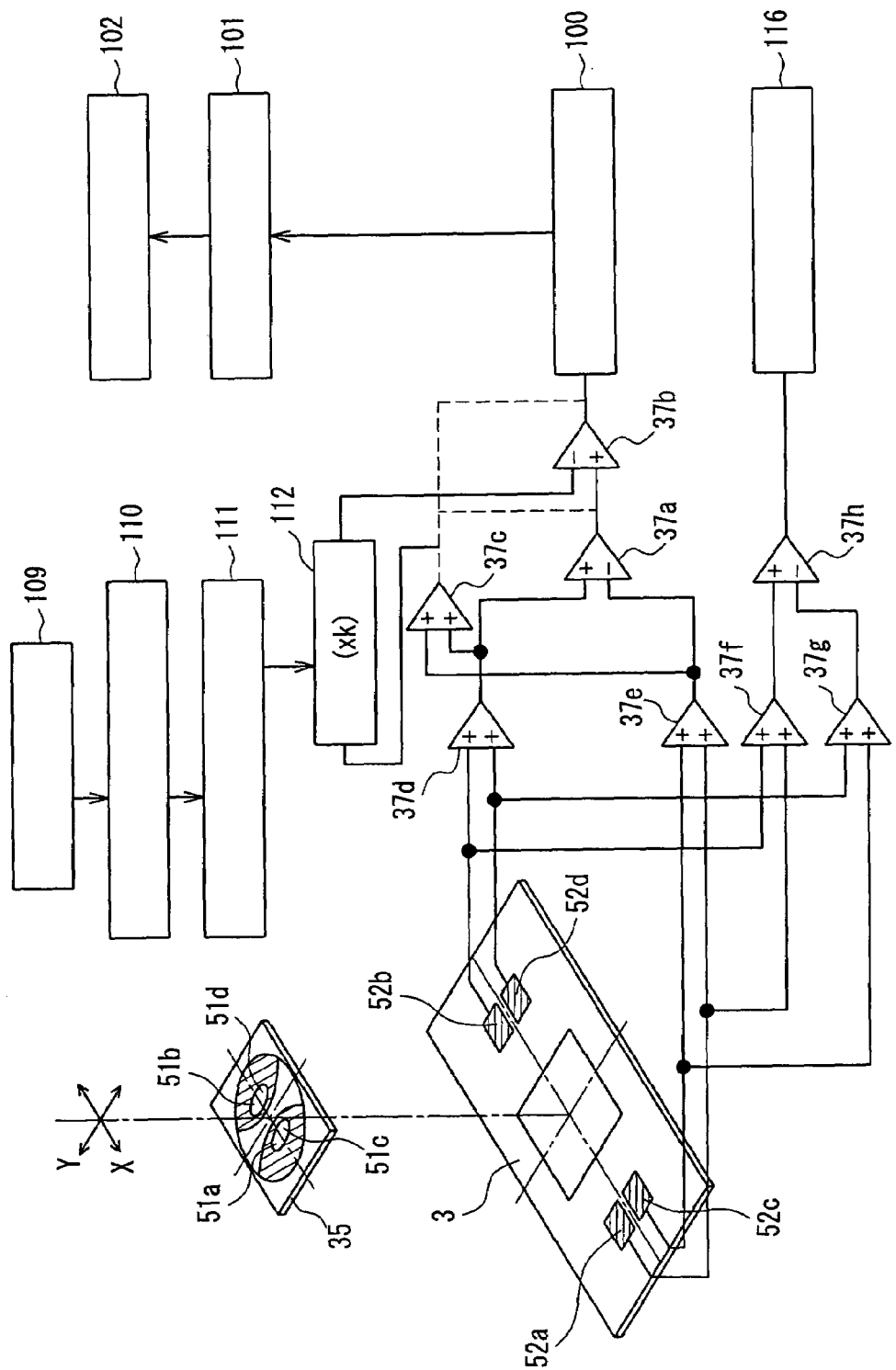
FIG. 12 includes an exploded perspective view showing a tilt detector according to another embodiment of the present invention and a block diagram showing the process of outputting a tilt correction signal.

Embodiment 2 will be described by referring to FIG. 12. FIG. 12 includes an exploded perspective view showing a tilt detector of an optical head in Embodiment 2 and a block diagram showing the process of outputting a tilt correction signal. The identical elements to those in FIG. 5 of Embodiment 1 are denoted by the same reference numerals, and a detailed explanation will not be repeated.

In Embodiment 2, the regions of the diffraction grating 35 (light beam separator) that are used as the light-receiving regions 32a and 32b in FIG. 5 of Embodiment 1 are divided into four regions 51a to 51d.

The regions 51a to 51d are substantial interference regions for light that is reflected from the magneto-optical recording medium 13 and travels in a straight path and ±first-order diffracted light produced by information tracks of the magneto-optical recording medium 13. Moreover, these regions are separated from each other in the X-axis (in the radial direction) and the Y-axis (in the tangential direction), and the two axes pass through a substantial center of the reflected light traveling in a straight path.

Four light-receiving regions 52a to 52d are formed on the multisegment photodetector 3 and correspond to the light-receiving regions 51a to 51d, respectively. The relative angles between the magneto-optical recording medium 13 and the objective lens 11 in both the radial and tangential directions can be detected by the outputs of differential amplifiers 37a to 37h based on the amounts of light entering the light-receiving regions 52a to 52d.

When a tangential tilt occurs, the interference pattern of zeroth-order light and ±first-order light on the diffraction grating 35 as shown in FIG. 10A deviates in the longitudinal direction of the sheet of the drawing as shown, e.g., in FIG. 10D, compared with the interference pattern in the absence of tilt. In the example of FIG. 10D, the interference pattern deviates upward.

In FIG. 12, the differential amplifier 37f outputs a value corresponding to the sum of the amounts of light entering the upper half light-receiving regions 52a and 52b, and the differential amplifier 37g outputs a value corresponding to the sum of the amounts of light entering the lower half light-receiving regions 52c and 52d. Moreover, the differential amplifier 37h outputs a value corresponding to an output difference between the differential amplifiers 37f and 37g. The output of the differential amplifier 37h has a correlation with the amount of tangential tilt. Therefore, the amount of tangential tilt can be calculated from the output of the differential amplifier 37h by using an arithmetic circuit (step 116).

When the differential amplifier 37d outputs a value corresponding to the sum of the amounts of light entering the right half light-receiving regions 52b and 52d, and the differential amplifier 37e outputs a value corresponding to the sum of the amounts of light entering the left half light-receiving regions 52a and 52c, the subsequent processes can be the same as those in FIG. 5 of Embodiment 1 to calculate the amount of radial tilt.

In this case, the amount of shift of the objective lens 11 in the radial direction may be calculated from the DC current value of the coil 18b. Alternatively, it may be calculated using the output of the differential amplifier 49 for the light-receiving regions 48a and 48b, as shown in FIG. 11 of Embodiment 1.

Like Embodiment 1, the amount of radial tilt can be corrected by changing the current values of the coils 18a, 18b. The amount of tangential tilt can be corrected by using an external device such as an elevating motor. The same is true for each of the following embodiments.

In this embodiment, the amounts of tilt in the tangential and radial directions can be detected in real time with high precision. Therefore, it is possible to perform recording/reproduction with even higher precision, thus significantly improving various recording/reproducing margins (e.g., servo margin, RF detection margin, or recording power margin).

Embodiment 3

Figures 13A, 13B:
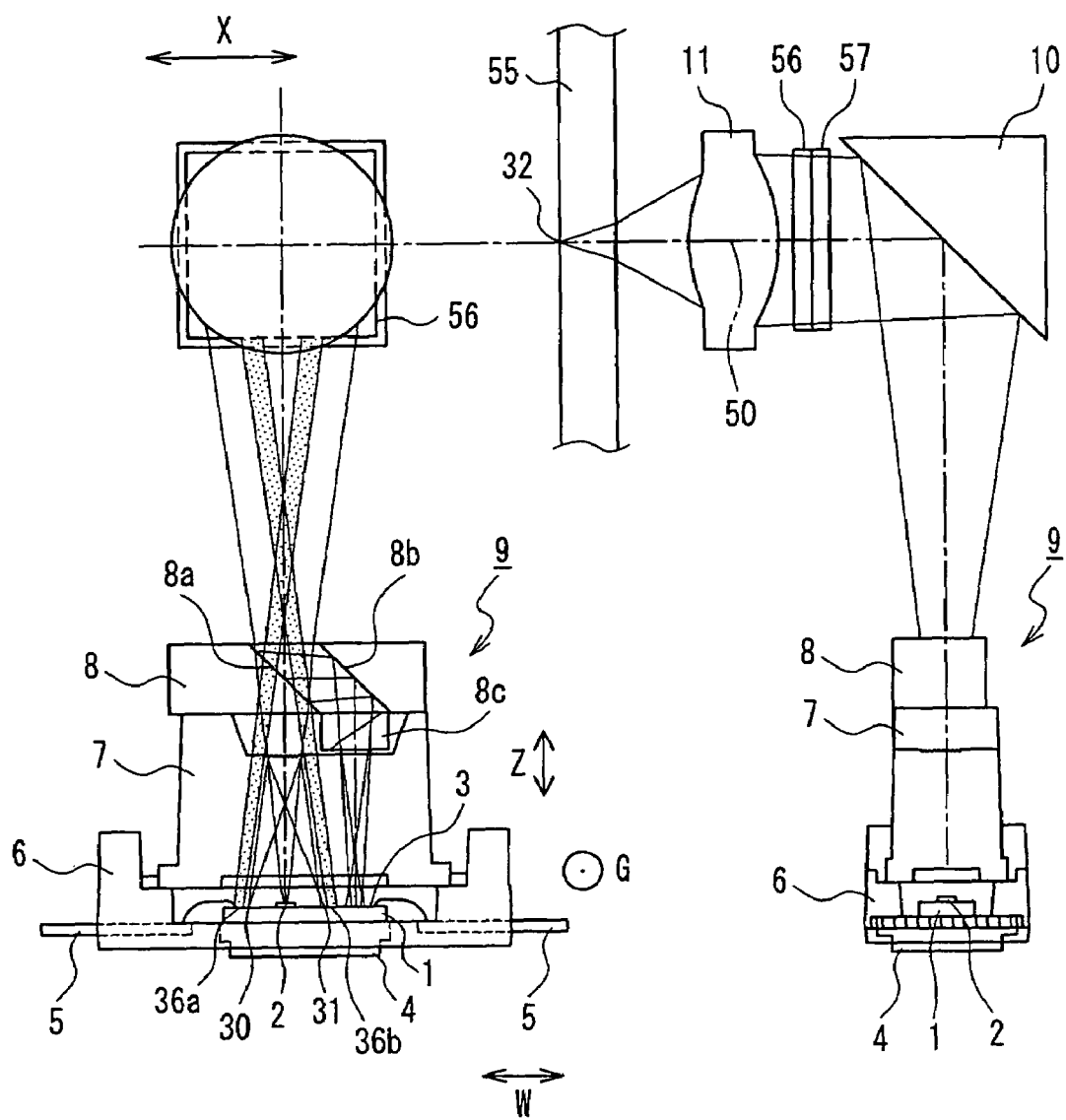
FIG. 13A is a plan view of an optical head according to an embodiment of the present invention.
FIG. 13B is a side view of the optical head in FIG. 13A.

Embodiment 3 will be described by referring to FIG. 13. FIG. 13 shows the configuration of an optical head in Embodiment 3. FIG. 13A is a plan view of the optical head, and FIG. 13B is a side view of the optical head in FIG. 13A. The identical elements to those in FIG. 1 of Embodiment 1 are denoted by the same reference numerals, and a detailed explanation will not be repeated.

This embodiment differs from Embodiments 1 and 2 in the configuration of a light beam separator for tilt detection. In Embodiments 1 and 2, the diffraction grating 35 is used as the light beam separator. In this embodiment, a so-called phase change medium 55 whose reflectance changes with the recording state is used instead of the magneto-optical recording medium 13, and a λ/4 plate 56 and a polarizing hologram 57 are used as the light beam separator for tilt detection.

The λ/4 plate 56 is located between the objective lens 11 and the semiconductor laser 2, and the polarizing hologram 57 is located between the λ/4 plate 56 and the semiconductor laser 2. The polarization direction of the semiconductor laser 2 is parallel to the sheet of the drawing (indicated by W in FIG. 13A). A forward light beam is circularly polarized after passing through the λ/4 plate 56. A reverse light beam that has been reflected by the phase change medium 55 is polarized after passing through the λ/4 plate 56 in the direction perpendicular to the sheet of the drawing (indicated by G in FIG. 13A), and then separated into a plurality of light beams by the polarizing hologram 57 that has a diffraction effect only for the polarization component in the G direction.

In this configuration, the forward light beam that travels in a path from the semiconductor laser 2 to the phase change medium 55 is not diffracted, but only the reverse light beam that is reflected by the phase change medium 55, passes through the λ/4 plate 56, and enters the polarizing hologram 57 is diffracted. Therefore, a loss of the forward light beam is reduced, so that a tilt detector with high light utilization efficiency can be achieved.

Although the polarization direction of the semiconductor laser 2 is parallel to the sheet of the drawing (indicated by W in FIG. 13A), it may be perpendicular to the sheet of the drawing. In such a case, the polarization direction should coincide with the direction in which the polarizing hologram 57 provides a hologram effect.

Moreover, a (5/4)λ plate may be used instead of the λ/4 plate 56.

Even if the polarization and separation element 8c is removed from this configuration, the tilt detection is not affected.

In Embodiment 3, the phase change medium is used as an information recording medium. However, a magneto-optical medium or ROM disk having a prepit also can be used.

Embodiment 4

Embodiment 4 will be described by referring to FIG. 14. FIG. 14A is a plan view showing a tilt detector of an optical head in Embodiment 4. FIG. 14B is a cross-sectional view taken along the direction perpendicular to the feed direction of the optical head in FIG. 14A.

In FIG. 14, reference numeral 62 is an optical disk, 2 is a semiconductor laser, 19 is an optical base, 50 is a collimator lens, 10 is a reflecting mirror, 11 is an objective lens, d1 is an effective light beam diameter (incident light beam diameter) of the objective lens 11, d2 is an effective light beam diameter (incident light beam diameter) of the collimator lens 50, and 60 is a light beam branching mirror that serves as a light beam reflection portion. Although not shown in FIG. 14, the optical head includes a configuration that corresponds to the objective lens drive 14 in FIG. 2.

Reference numeral 61 is a light-receiving element divided into two light-receiving regions 61a and 61b, and 63 is a differential output that is calculated and output by a differential operational unit using signals detected in the light-receiving regions 61a and 61b.

The semiconductor laser 2, the objective lens drive (not shown), the light beam branching mirror 60, and the light-receiving element 61 are held by the optical base 19.

The relationship between the effective light beam diameter d2 of the collimator lens 50 and the effective light beam diameter d1 of the objective lens 11 is expressed by $$d2=d1+s$$

where s represents the amount of shift of the objective lens 11 in the radial direction.

The divergent light that is emitted from the semiconductor laser 2 and travels substantially outside the effective light beam diameter d2 of the collimator lens 50 is identified as an out-of-effective diameter light beam 58. The light beam branching mirror 60 reflects part of the out-of-effective diameter light beam 58 onto the optical disk 62. The light beam branching mirror 60 is configured precisely so that a light reflection film is formed integrally with part of the optical base 19 made of metal or resin. The light reflection film can be formed by deposition or application. Any optical reflection films such as an aluminum reflection film and a dielectric film can be used. The light beam branching mirror 60 made of glass also may be formed integrally with the optical base 19 made of resin.

The light beam that is reflected by the light beam branching mirror 60 and then is reflected by the optical disk 62 enters the light-receiving regions 61a, 61b of the light-receiving element 61. In this case, the light-receiving element 61 is set so that the differential output 63 is substantially zero when the amount of relative tilt between the optical disk 62 and a predetermined reference plane (e.g., an optical disk holding portion of the turntable or part of the optical base 19) in the radial direction is substantially zero degree. That is, a difference between outputs corresponding to the amounts of light entering the light-receiving regions 61a and 61b that are separated from each other in the radial direction (X direction) is substantially zero. Therefore, a tilt of the optical disk 62 can be detected by the output of the differential output 63.

When the angle of the objective lens 11 is corrected by changing the current values of the coils 18a, 18b in accordance with the output value of the differential output 63, as described in Embodiment 1, the relative angle between the optical disk 62 and the objective lens 11 also can be adjusted to an optimum value.

This embodiment differs from each of the above embodiments in that the out-of-effective diameter light beam 58 that travels outside the effective light beam diameter d2 of the collimator lens 50 is used for detecting a radial tilt of the optical disk 62. Thus, it is possible to provide a tilt detector with higher light utilization efficiency (i.e., less loss of the amount of light).

Figure 15A:
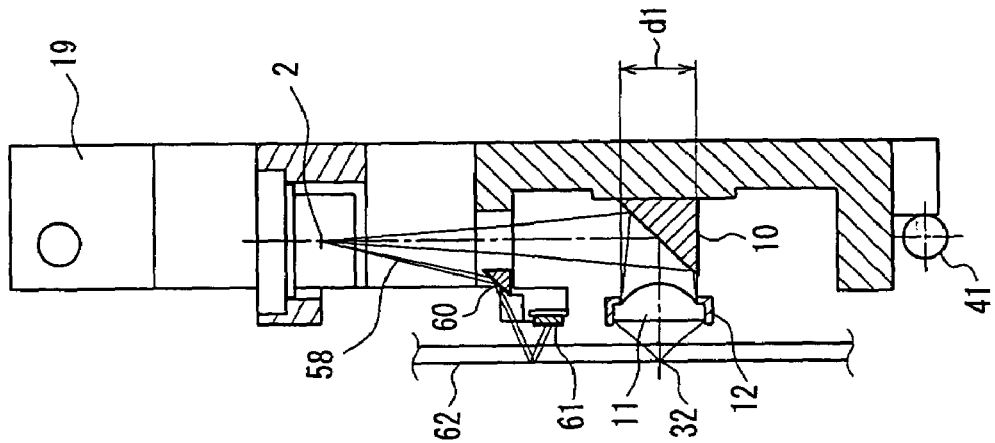
FIG. 15A is a cross-sectional view showing a second example of a tilt detector of an optical head in Embodiment 4 of the present invention.
Figure 15B:
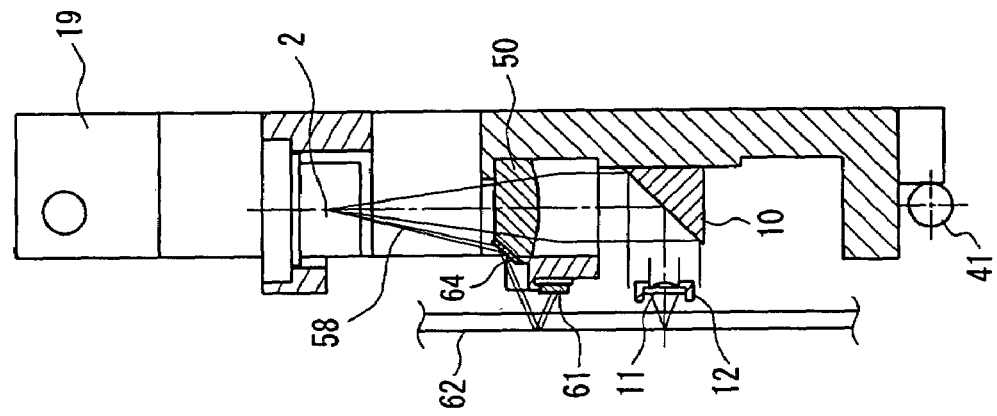
FIG. 15B is a cross-sectional view showing a third example of a tilt detector of the optical head in Embodiment 4 of the present invention.

The light beam branching mirror 60 is configured by the application or deposition of a reflection film on part of the optical base 19. However, another configuration also can be used. FIGS. 15A and 15B are cross-sectional views showing an optical head that includes another example of the configuration corresponding to the light beam branching mirror 60.

In FIG. 15A, a reflecting mirror 60a is bonded to or integrated with the optical base 19. The reflecting mirror 60a may be made of glass or the like and has a reflection surface on which a dielectric film or the like is deposited. In FIG. 15B, a light beam reflection portion 64 is provided in a portion that is part of the exterior of the collimator lens 50 and part of the outside of the effective light beam diameter of the collimator lens 50, so that light beams are directed to the optical disk 62 and the light-receiving element 61. In this case, the reflection surface of the light beam reflection portion 64 may be adjusted by rotating it about the optical axis.

Embodiment 5

Embodiment 5 will be described by referring to FIG. 15C. This embodiment differs from each of the above embodiments in the use of a so-called finite optical system that does not include the collimator lens 50.

Figures 14A, 14B:
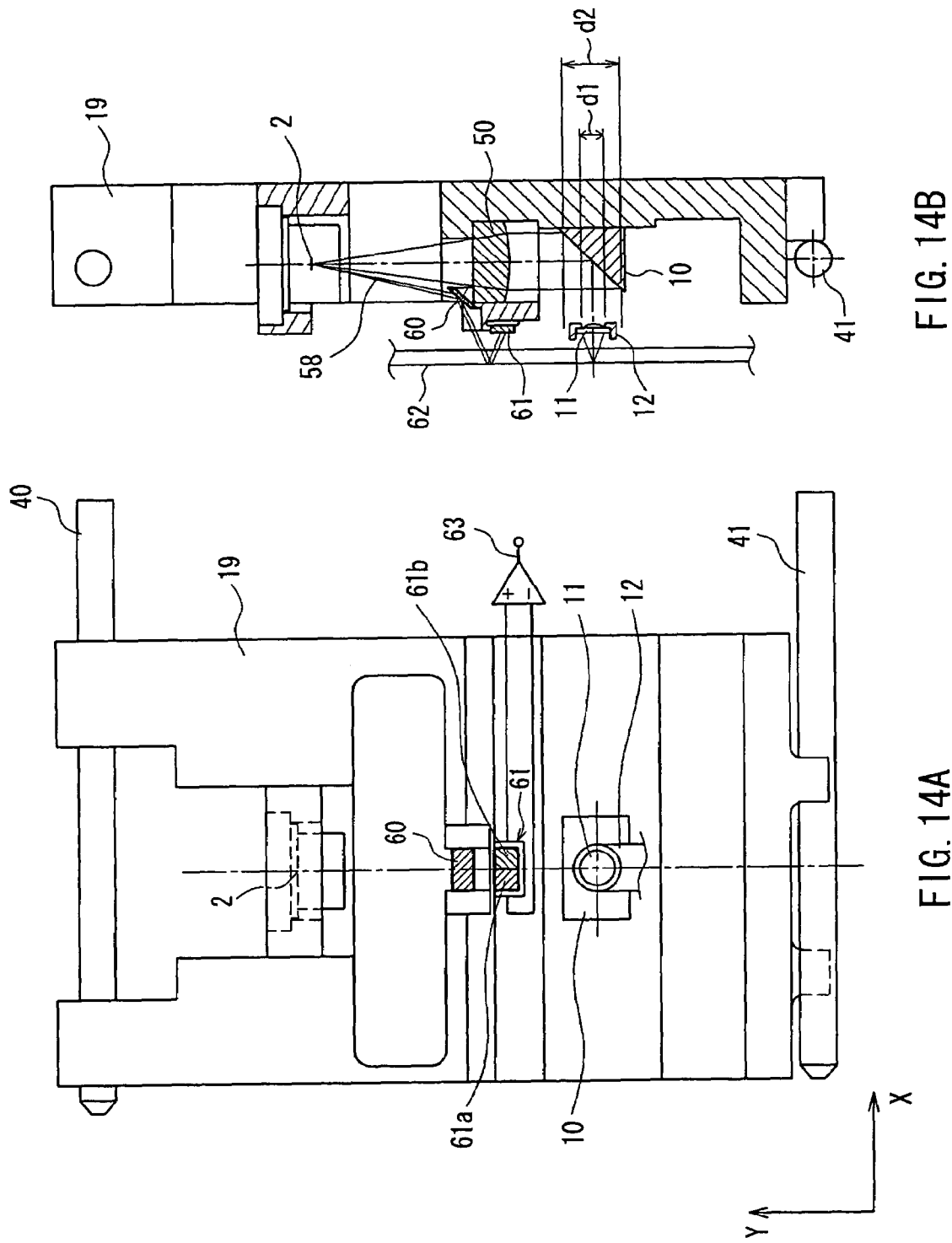
FIG. 14A is a plan view showing a tilt detector of an optical head according to an embodiment of the present invention.
FIG. 14B is a cross-sectional view taken along the direction perpendicular to the feed direction of the optical head in FIG. 14A.
Figure 15C:
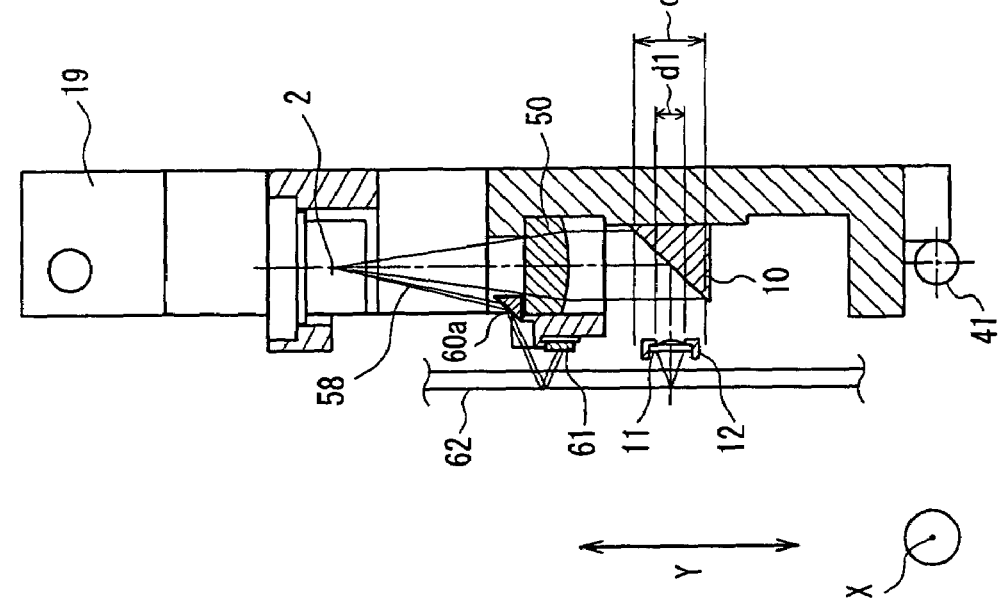
FIG. 15C is a cross-sectional view showing a tilt detector of an optical head in Embodiment 5 of the present invention.

FIG. 15C is a cross-sectional view taken along the direction perpendicular to the feed direction of an optical head in this embodiment, and corresponds to FIGS. 14B, 15A, and 15B in Embodiment 4.

Like Embodiment 4, the light beam branching mirror 60 reflects a light beam 58 that travels outside the effective light beam diameter d1 of the objective lens 11, and is configured precisely so that an optical reflection film such as an aluminum reflection film or dielectric film is applied or deposited on part of the optical base 19.

This embodiment employs the finite optical configuration without the collimator lens 50. Therefore, the optical head can achieve a small size and high efficiency while including a tilt detector. Thus, it is possible to provide a small, thin, low-power consumption disk recording/reproducing apparatus.

FIG. 16 shows a light-receiving element that is divided into four parts for detection. In the example of FIG. 16, the light-receiving element 61 is divided into four light-receiving regions 61a to 61d, which are separated from each other in the radial direction (X direction) and the tangential direction (Y direction). With this configuration, both radial and tangential tilts can be detected precisely.

Figure 16A:
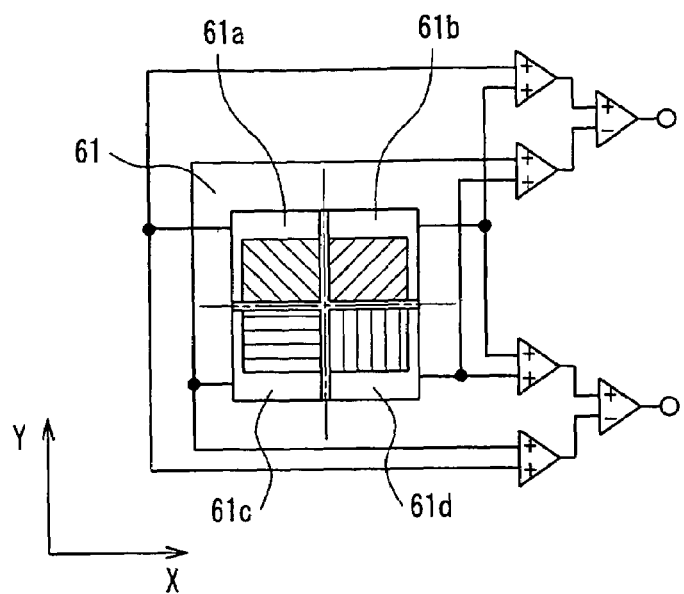
FIG. 16A shows a light beam distribution that indicates the absence of radial tilt and tangential tilt in a dividing pattern of a light-receiving element in Embodiment 5 of the present invention.

FIG. 16A shows the state in which neither a radial tilt nor a tangential tilt occurs, and equal amounts of light enter the light-receiving regions 61a to 61d, respectively.

Figure 16B:
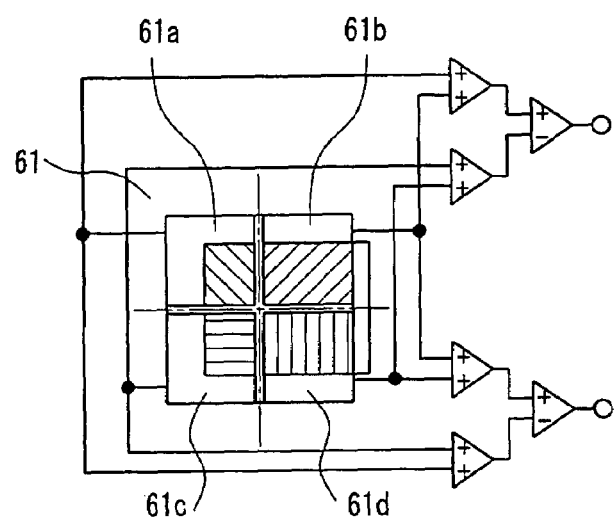
FIG. 16B shows a light beam distribution that indicates the presence of radial tilt but the absence of tangential tilt in a dividing pattern of the light-receiving element in Embodiment 5 of the present invention.

FIG. 16B shows the state in which a radial tilt occurs, while a tangential tilt does not occur, and there is a difference between the amount of light entering the light-receiving regions 61a, 61c and the amount of light entering the light-receiving regions 61b, 61d.

In this case, a radial tilt can be detected based on a difference between the sum of the amounts of light entering the light-receiving regions 61a, 61c and the sum of the amounts of light entering the light-receiving regions 61b, 61d.

Moreover, a tangential tilt can be detected based on a difference between the sum of the amounts of light entering the light-receiving regions 61a, 61b and the sum of the amounts of light entering the light-receiving regions 61c, 61d. In FIG. 16B, the difference is zero, and therefore the detected tangential tilt is zero.

Figure 16C:
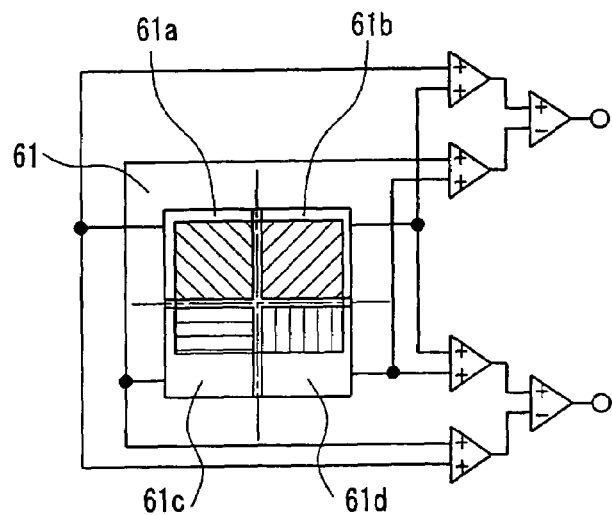
FIG. 16C shows a light beam distribution that indicates the presence of tangential tilt but the absence of radial tilt in a dividing pattern of the light-receiving element in Embodiment 5 of the present invention.

FIG. 16C shows the state in which a tangential tilt occurs, while a radial tilt does not occur, and there is a difference between the amount of light entering the light-receiving regions 61c, 61d and the amount of light entering the light-receiving regions 61a, 61b.

The tilt in each direction can be detected as described above. Specifically, a tangential tilt can be detected based on a difference between the sum of the amounts of light entering the light-receiving regions 61a, 61b and the sum of the amounts of light entering the light-receiving regions 61c, 61d.

Since a difference between the sum of the amounts of light entering the light-receiving regions 61a, 61c and the sum of the amounts of light entering the light-receiving regions 61b, 61d is zero, the detected radial tilt is zero.

The configuration of this embodiment that allows the light-receiving element to be divided into four parts may be used in Embodiment 4.

Embodiment 6

Figure 17C:
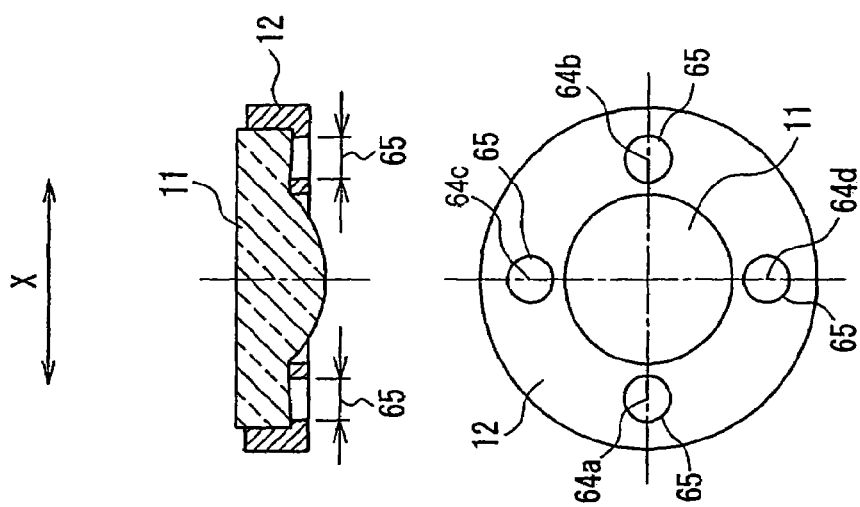
FIG. 17C shows yet another example of a light beam reflection portion in Embodiment 6 of the present invention.

Embodiment 6 will be described by referring to FIG. 17. FIG. 17A shows the schematic configuration of an optical head in Embodiment 6. Reference numeral 2 is a semiconductor laser, 50 is a collimator lens, and 12 is an objective lens holder having a light beam reflection surface 64 at the bottom. The light beam reflection surface 64 is formed on the underside of the objective lens holder 12. A light beam reflection film is applied or deposited on the light beam reflection surface 64.

Reference numeral 75 is a light-receiving region provided on a multisegment photodetector 3. The light-receiving region 75 has two light-receiving regions 75a, 75b that are separated in the radial direction (X direction). The light-receiving regions 75a, 75b are shown in a plan view, and 77 denotes a light beam. Reference numeral 76 is a differential output that is calculated and output by a differential operational unit using signals detected in the light-receiving regions 75a and 75b.

This embodiment differs from each of the above embodiments in that a light beam that has been reflected by the light beam reflection surface 64 enters the light-receiving regions 75a, 75b. In this embodiment, when the amount of radial shift of the objective lens 11 is substantially zero μm, and the amount of radial tilt of an optical disk 62 with respect to a predetermined reference plane (e.g., the surface of the turntable on which the optical disk 62 is held or the reference surface of the optical base 19) is substantially zero degree, the differential output is substantially zero mV.

When the objective lens 11 tilts in the radial direction, the light beam reflection surface 64 also tilts along with the objective lens 11, and the output of the differential output 76 is changed. Thus, a radial tilt of the objective lens 11 can be detected.

The relative angle between the information recording medium and the objective lens 11 also can be detected by using the detection value of a light-receiving region that receives a light beam that passes through the objective lens 11 and is reflected by the information recording medium. For example, when the relative angle between the information recording medium and the objective lens 11 is substantially zero degree, the detection value of the light-receiving region that receives a reflected light beam from the information recording medium may be defined as a reference value. If a tilt of the information recording medium or the objective lens 11 occurs, the detection value varies from the reference value. In this condition, when the objective lens 11 tilts in the radial direction, the detection value of the light-receiving region that receives a reflected light beam from the information recording medium also varies. Therefore, based on the output of the differential output 76 at the time the detection value becomes equal to the reference value, the relative angle between the information recording medium and the objective lens 11 can be detected.

The objective lens 11 can tilt in the radial direction by allowing different currents to flow through the coils 18a and 18c, as described in Embodiment 1.

Figure 17B:
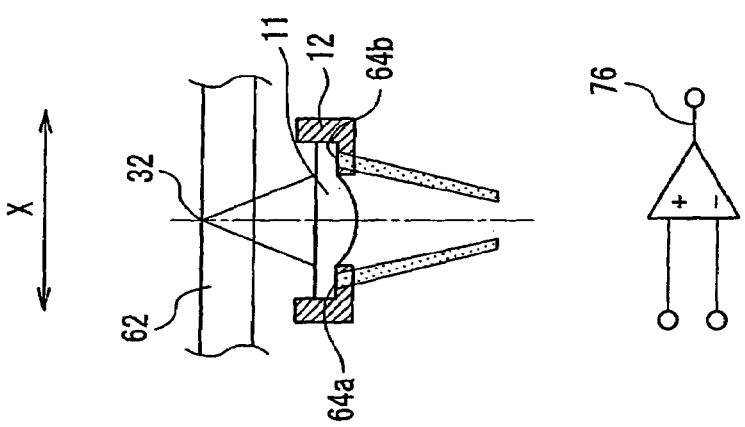
FIG. 17B shows another example of a light beam reflection portion in Embodiment 6 of the present invention.
Figure 17A:
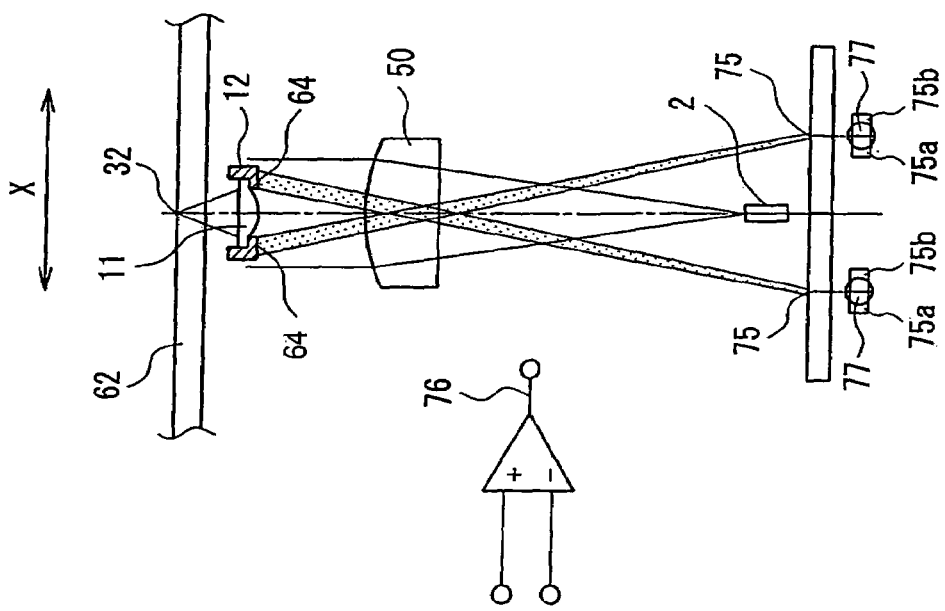
FIG. 17A shows the schematic configuration of an optical head in Embodiment 6 of the present invention.

FIG. 17B shows another example of a light beam reflection portion. In this example, light beam reflection portions 64a and 64b are formed in the edge portions of the objective lens 11. A light beam reflection film is applied or deposited on the light beam reflection portions 64a and 64b. The objective lens holder 12 has openings through which a light beam passes in the portions corresponding to the light reflection portions 64a and 64b, respectively.

FIG. 17C shows yet another example of a light beam reflection portion. The objective lens 11 includes four light beam reflection portions 64a to 64d as light beam reflection surfaces. The objective lens holder 12 has light beam reflection apertures 65 as openings. Consistent with this configuration, four light-receiving regions, each of which is divided into four parts, may be provided to detect both radial and tangential tilts.

Even if a tilt occurs while the objective lens is shifted in the radial direction, the radial tilt of the optical disk 62 can be detected with higher precision by correcting the amount of change in the differential output 76 using the amount of shift of the objective lens 11 in the radial direction.

As described in Embodiment 1, the amount of radial shift may be calculated from a current applied to the objective lens drive in the radial direction (i.e., the DC current value of the coil 18b). Alternatively, with a configuration that corresponds to the diffraction grating 35, the amount of radial shift may be calculated from the amounts of light in regions (the light beam regions 48a, 48b) outside the substantial interference regions.

In this embodiment, a tilt of the optical disk 62 can be performed with a simple configuration requiring fewer components, thus achieving a low-cost tilt detector.

The light-receiving region 75 is placed at two positions in FIGS. 17A and 17B. However, it may be placed at one position.

This embodiment employs the infinite optical system including a collimator lens. However, the finite optical system also can be used.

Moreover, the light beam reflection surface 64 is formed on the underside of the objective lens holder 12. However, it may be formed in a portion outside the effective light beam diameter of the objective lens 11 other than the objective lens holder 12, as long as the light beam reflection surface 64 can move together with the objective lens 11.

Embodiment 7

Embodiment 7 will be described by referring to the drawings. This embodiment differs from each of the above embodiments in the configuration of tilt detection. In this embodiment, a driving waveform pattern that is a voltage (current) pattern having a predetermined shape is applied to the objective lens drive 14 for the tilt detection.

This embodiment includes a voltage controller (not shown) for driving the objective lens 11 in the focusing direction and a processing circuit device (not shown). The voltage controller can apply a driving voltage (current) pattern to the objective lens drive 14. A focusing error signal (S-shaped signal) for the driving voltage (current) pattern can be detected in the focusing error signal light-receiving region (FIG. 3), and this detection value is calculated by the processing circuit device.

The driving waveform pattern is applied by outputting the same waveform to each of the coils 18a and 18c (FIG. 2).

Figure 18A:
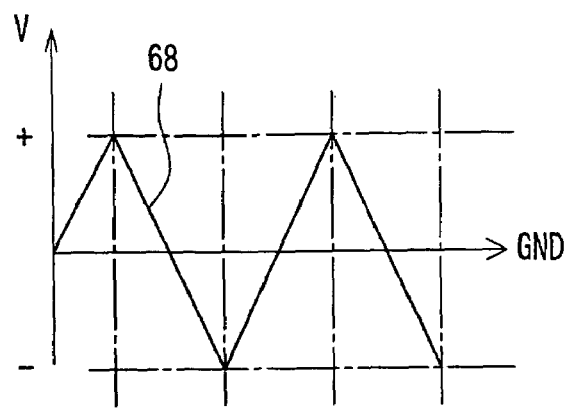
FIG. 18A shows an example of a driving waveform pattern of a triangular wave in Embodiment 7 of the present invention.
Figure 18B:
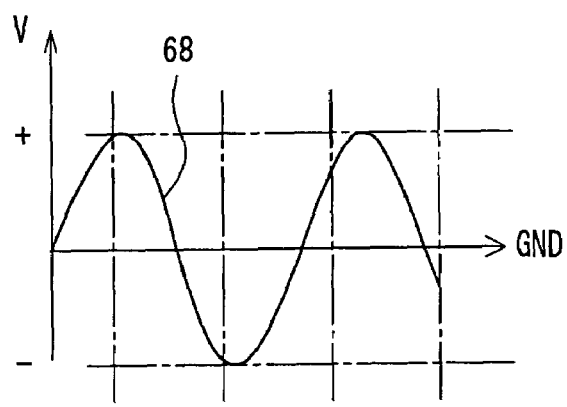
FIG. 18B shows an example of a driving waveform pattern of a sine wave in Embodiment 7 of the present invention.
Figure 18C:
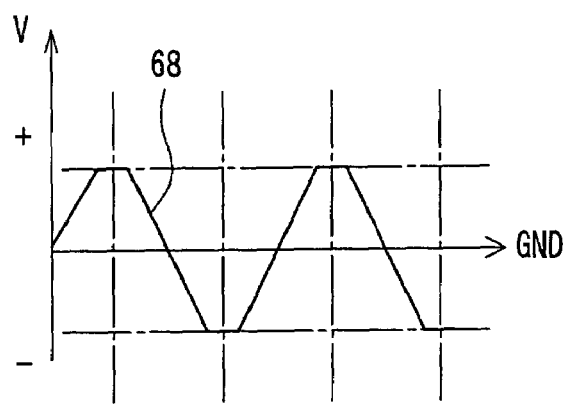
FIG. 18C shows an example of a driving waveform pattern of a trapezoidal wave in Embodiment 7 of the present invention.

The following is a detailed explanation of this embodiment with reference to the drawings. FIG. 18 shows examples of the driving waveform pattern that is a voltage (current) pattern having a predetermined shape. The driving waveform pattern may be a triangular wave (FIG. 18A), a sine wave (FIG. 18B), a trapezoidal wave (FIG. 18C), or any predetermined shape.

Figure 19:
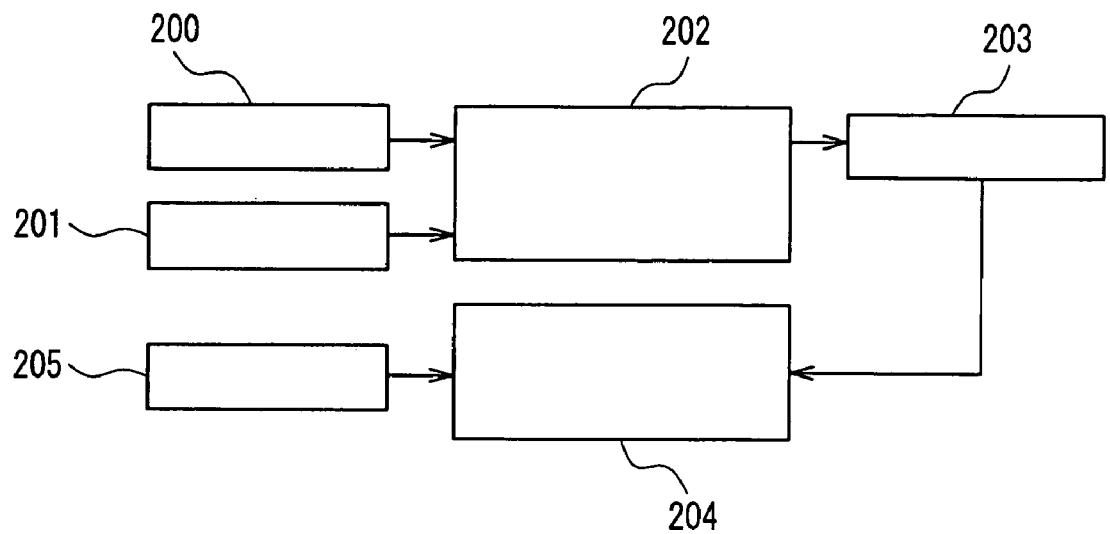
FIG. 19 is a block diagram showing an operation flow of tilt detection in Embodiment 7 or the present invention.

FIG. 19 is a block diagram showing an operation flow of tilt detection in this embodiment. First, the voltage controller applies a driving waveform pattern to the objective lens drive 14 so as to drive the objective lens 11 in the focusing direction (step 200). At the same time as the step 200, a focusing error signal (S-shaped signal) for the applied driving waveform pattern is detected in the focusing error signal light-receiving region 24 (step 201).

Figure 20:
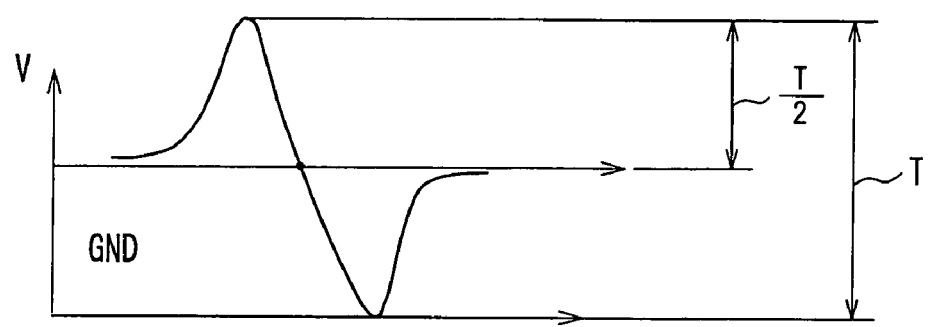
FIG. 20 shows a focusing error signal in Embodiment 7 of the present invention.

FIG. 20 shows the focusing error signal. A vertical axis v represents a voltage (or distance), and a horizontal axis represents a relative distance between the magneto-optical recording medium 13 and the objective lens 11. T represents the amplitude of the S-shaped signal, and a focus point is indicated by the position of T/2 (at which the S-shaped signal intersects with the horizontal axis). The same is true for FIGS. 21 and 22.

In a step 202, the processing circuit device performs calculation in which the height of the magneto-optical recording medium 13 from a reference position P is detected by using the driving waveform pattern and the focus position of the S-shaped signal.

Figure 21:
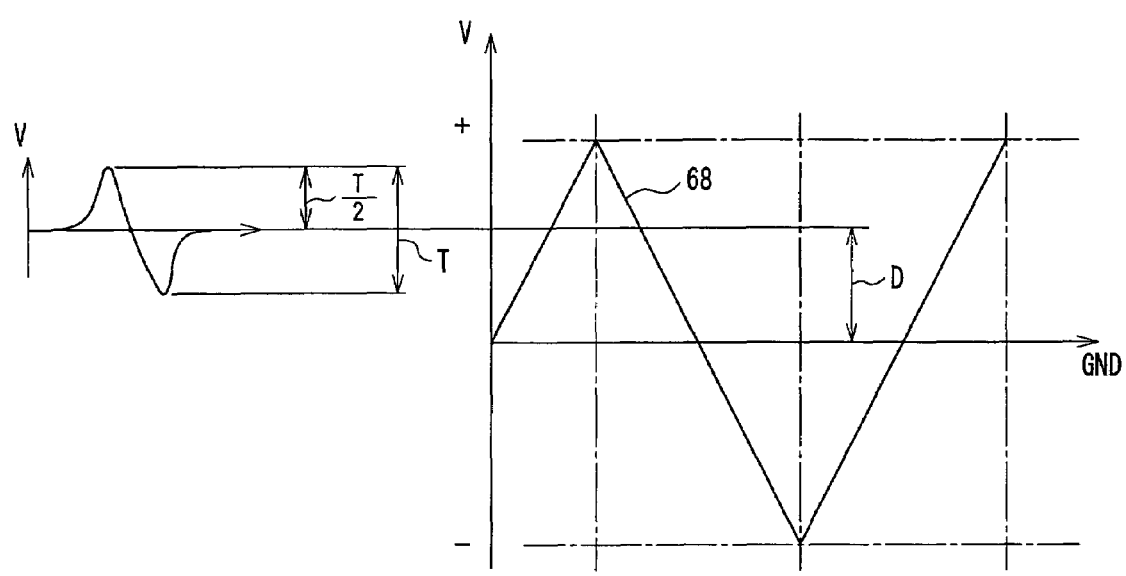
FIG. 21 shows calculation by a processing circuit device in Embodiment 7 of the present invention.

Specifically, as shown in FIG. 21, the processing circuit device calculates a voltage value T/2 at the point about one-half the amplitude T of the focusing error signal. The amplitude T can be determined based on a voltage value of the driving waveform pattern that corresponds to the maximum value of the S-shaped signal and a voltage value of the driving waveform pattern that corresponds to the minimum value of the S-shaped signal.

When the amplitude T is determined, the voltage value T/2 also is determined, thereby producing a voltage value of the driving waveform pattern at the focus point (intersection point of the S-shaped signal and the horizontal axis). This voltage value may be calculated by either of the following: a) add the voltage value T/2 to the voltage value of the driving, waveform pattern that corresponds to the minimum value of the S-shaped signal; b) subtract the voltage value T/2 from the voltage value of the driving waveform pattern that corresponds to the maximum value of the S-shaped signal.

In this manner, a voltage value D of a voltage (current) pattern 68 at the focus point measured from GND (or reference voltage value) is obtained. By determining the voltage value D, the position of the objective lens 11 in the focusing direction with respect to the reference position can be calculated using the voltage sensitivity (μm/V, μm/A) of the objective lens 11 in the focusing direction due to the objective lens drive 13. Thus, it is possible to detect the height of the information recording surface of the magneto-optical recording medium 13 from the reference position (e.g., the disk holding surface of the turntable).

Moreover, while the optical head is moved in the radial direction, the same process as described above is repeated at a radial position(s) different from the radial position used in the above detection so that the height (voltage) D of the information recording surface of the magneto-optical recording medium 13 is detected.

Consequently, the relative position of the magneto-optical recording medium 13 to the reference position (reference plane) in the focusing direction can be detected. Moreover, it is also possible to calculate a change in the relative angle between the magneto-optical recording, medium 13 and the objective lens 11, the amount of tilt, the amount of warping, or the cross-sectional shape of the magneto-optical recording medium 13.

The radial movement of the optical head can be performed by the optical head feeder that includes the feed screw 40, the jackshaft 41, the feed motor 42, the gears 43a and 43b, the nut plate 44, the bearing 45, and the mechanical base 46, as shown in FIG. 4.

When the magneto-optical recording medium 13 does not tilt, the height D of the information recording surface of the magneto-optical recording medium 13 is detected as a constant value regardless of the position in the radial direction.

Moreover, a change in the relative angle between the objective lens 11 and the magneto-optical recording medium 13 can be corrected in such a manner that the calculated value is stored in a memory 70, and the amount of current (voltage) corresponding to the change in the relative angle between the objective lens 11 and the magneto-optical recording medium 13 is applied to the coils 18a and 18c at any position of the objective lens 11 in the radial direction. Thus, high-speed tilt detection and correction can be achieved by so-called learning control.

In Embodiment 7, therefore, the amount of radial tilt of the magneto-optical recording medium 13 with respect to a predetermined reference plane (e.g., the holding portion of the turntable for the magneto-optical recording medium 13 or the reference surface of the optical base 19), the amount of warping, or the cross-sectional shape of the magneto-optical recording medium 13 can be detected at high speed without performing focus servo and tracking servo. This makes it possible to provide a disk recording/reproducing apparatus with higher performance. Moreover, the optical head does not require any components for tilt detection, and thus the size, thickness, and cost of the disk recording/reproducing apparatus can be reduced.

The holding portion of the turntable for the magneto-optical recording medium 13 is used as a reference position (reference plane). However, the reference position is not particularly limited and may be, e.g., the reference surface of the optical base 19 or a predetermined place such as a shaft.

Moreover, the number of positions for detection in the radial direction is not particularly limited as long as the detection is carried out at one or more positions. Also, the detection can start with either the inner or the outer circumference of the magneto-optical recording medium.

Figure 22:
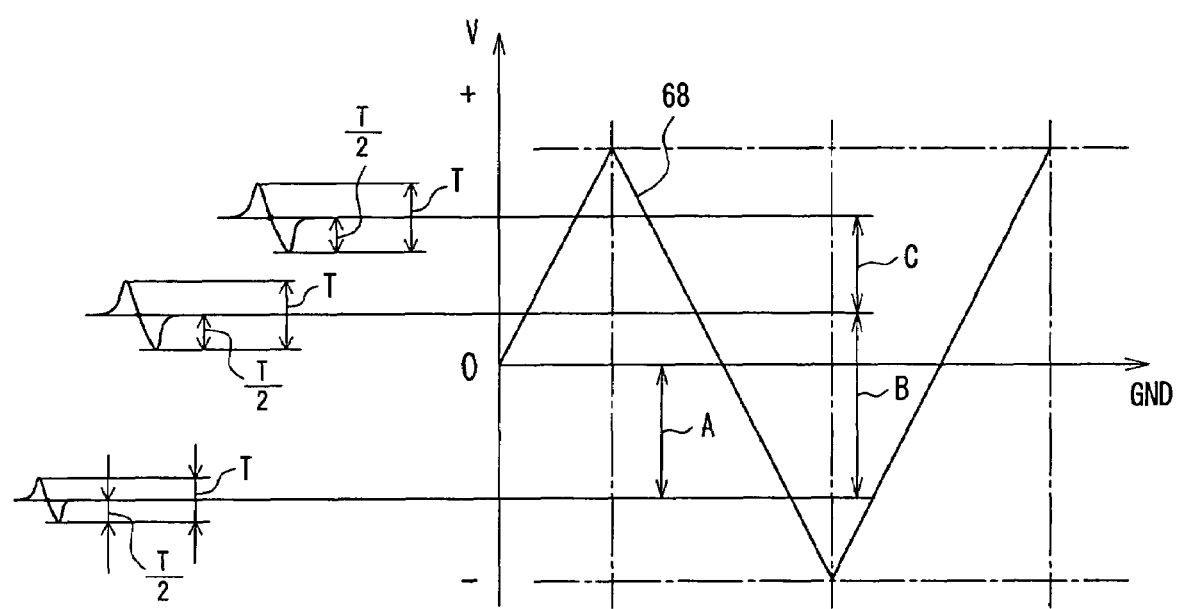
FIG. 22 shows another example of calculation by a processing circuit device in Embodiment 7 of the present invention.

The S-shaped signal is generated from only one position of the information recording surface. As shown in FIG. 22, however, the S-shaped signal may be generated due to surface reflection of the magneto-optical recording medium 13 (a height A in FIG. 22), or a plurality of S-shaped signals may be generated by the information surfaces of a two-layer structure such as a phase change medium (heights B and C in FIG. 22).

In this case, the information surface of the information recording medium on which a tilt is measured can be specified using the amplitude of the S-shaped signal, the shape of the driving waveform, the order of successively generated S-shaped signals, the reflectance, or the like.

Embodiment 8

Figure 23A:
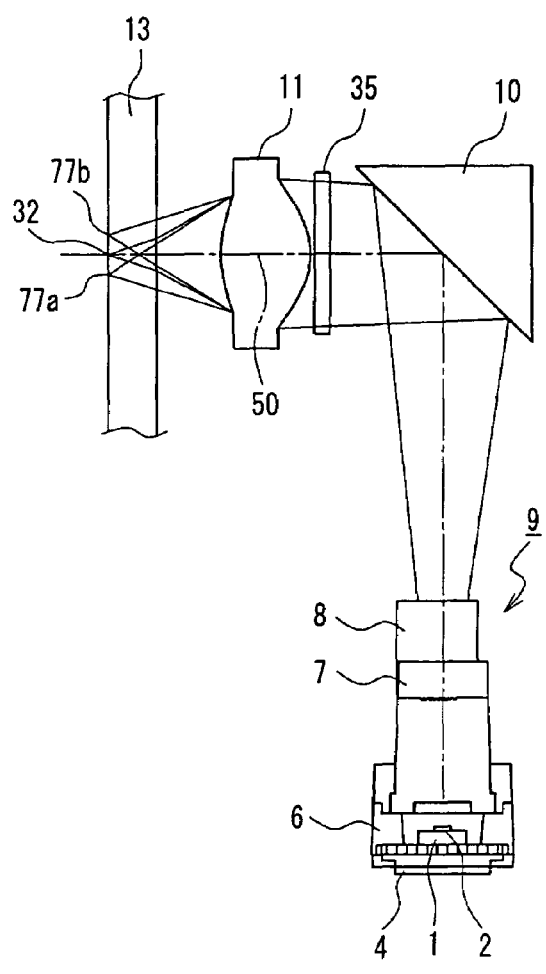
FIG. 23A shows the schematic configuration of an optical head in Embodiment 8 of the present invention.
Figure 23B:
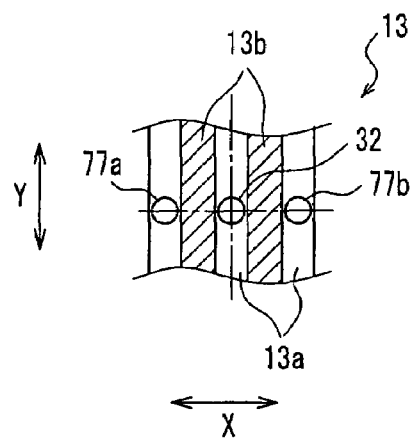
FIG. 23B shows the angular relationship between information tracks and light spots in Embodiment 8 of the present invention.
Figure 23C:
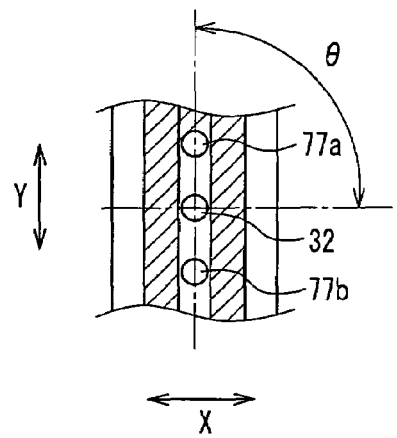
FIG. 23C shows another example of the angular relationship between information tracks and light spots in Embodiment 8 of the invention.
Figure 24:
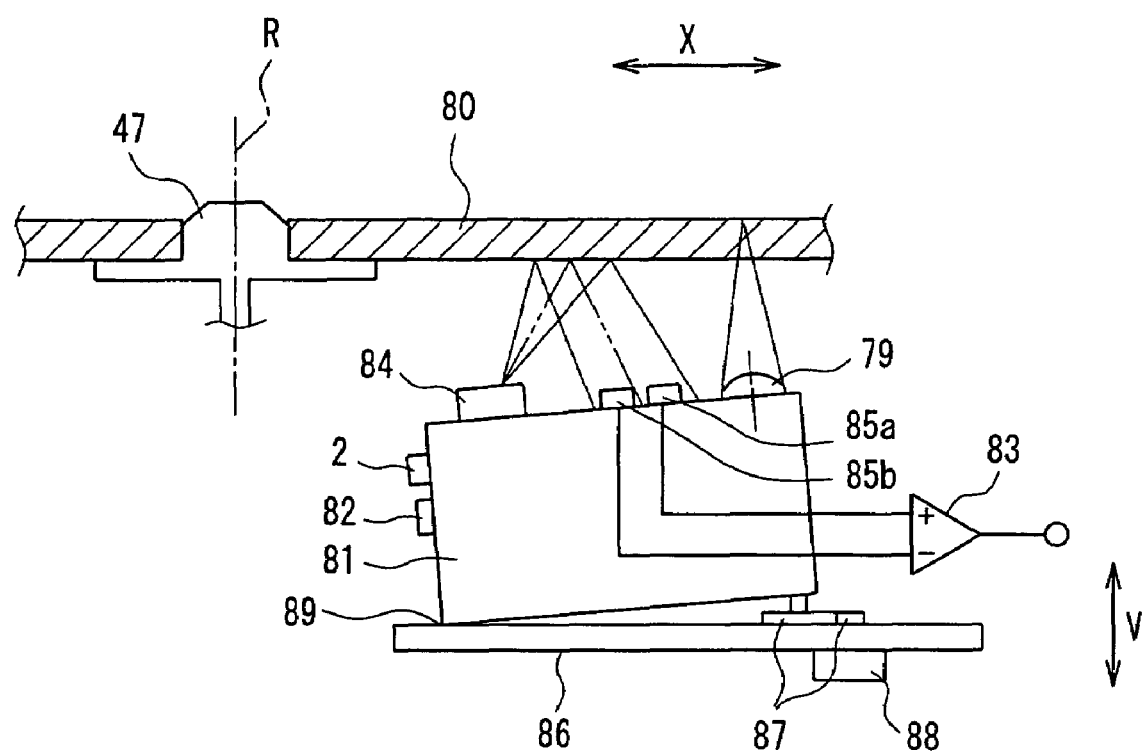
FIG. 24 shows an example of the schematic configuration and operating principle of a conventional tilt detector of an optical head.

Embodiment 8 will be described by referring to FIG. 23. FIG. 23A is a schematic side view showing an optical head in Embodiment 8. FIGS. 23B and 23C show the angular relationship between information tracks of the magneto-optical recording medium 13 and light spots 77a, 77b for tilt detection.

This embodiment differs from each of the above embodiments in that a plurality of light spots 32, 77a, and 77b are formed on the magneto-optical recording medium 13 by a plurality of light beams after passing through the diffraction grating 35.

The light spots 77a and 77b are used for tilt detection of the magneto-optical recording medium 13 and set at a predetermined angle with respect to the information tracks. In this case, the angle of the light spots may be adjusted either by rotating the diffraction grating 35 or by rotating the objective lens drive 14 around the optical axis of the objective lens 11 with an external jig (not shown), as shown in FIG. 8A.

The light beams of the light spots 77a, 77b for tilt detection are reflected by the magneto-optical recording medium 13, go back on the opposite path, and enter light-receiving regions (not shown) on the multisegment photodetector 3 (FIG. 3) that correspond to the light spots 77a and 77b, respectively.

Comparing the amplitude or DC values of two signals detected in the light-receiving regions, the radial tilt of the magneto-optical recording medium 13 can be detected.

FIG. 23B and FIG. 23C show the angular relationship between the information tracks of the magneto-optical recording medium 13 and the light spots 77a, 77b for tilt detection when the adjusted angle θ of the diffraction grating 35 is 0 degree and 90 degrees, respectively.

Although the adjusted angle θ of the diffraction grating 35 may be any angle in the range of 0 to 90 degrees, the light spots 77a and 77b should be arranged at the positions where there is no difference between outputs of the light spots 77a, 77b with a tilt of 0 degree (those positions differ depending on a space between tracks of the information recording medium).

In the example of FIG. 23B (θ is 0 degree), each of the light spots 77a, 77b is located on different tracks (adjacent grooves 13a (or adjacent lands 13b)), and only a radial tilt can be detected.

In the example of FIG. 23C (θ is 90 degrees), the light spots 77a, 77b are located on the same track, and only a tangential tilt can be detected.

When the position is adjusted between 0 and 90 degrees, both tangential and radial tilts can be detected.

This embodiment allows the tilt detection to be performed based on a track pitch of the information recording medium with a simple configuration, thus providing a small low-cost tilt detector and disk recording/reproducing apparatus.

In this embodiment, the magneto-optical recording medium 13 is used as an information recording medium. However, a phase change medium or ROM disk having a prepit also can be used.

The elliptical direction of a light spot differs with the astigmatism of the light spot, and thus changes the modulation factor of a signal such as wobble in the detected amount of light.

INDUSTRIAL APPLICABILITY

As described above, an optical head of the present invention can detect a tilt without requiring a special light source for tilt detection, reduce both size and thickness, and correct the tilt with excellent responsiveness. Therefore, the optical head is useful for a disk recording/reproducing apparatus that records/reproduces an optical disk (information recording medium).

The invention claimed is:

1. An optical head comprising:
   a semiconductor laser;
   an objective lens for focusing a light beam from the semiconductor laser onto an information recording medium;
   a light beam separator that is located between the semiconductor laser and the objective lens, includes interference regions for light that is reflected from the information recording medium and travels in a straight path and ±first-order diffracted light produced by information tracks of the information recording medium, and diffracts each of plural light beams in regions of the interference regions, where an amount of light is changed by a change in a relative angle between the information recording medium and the objective lens and by a shift of the objective lens in a radial direction of the information recording medium;
   a light-receiving element that receives the light beam that is reflected by the information recording medium and separated by the light beam separator, and converts the light beam to an electrical signal; and
   an arithmetic circuit that corrects a value of the electrical signal detected by the light-receiving element in accordance with a radial position signal corresponding to an amount of shift of the objective lens in the radial direction of the information recording medium, and detects the relative angle between the information recording medium and the objective lens or an amount of tilt of the information recording medium with respect to a predetermined reference plane.

2. The optical head according to claim 1, wherein the light beam separator diffracts part of each of the light beams in the interference regions.

3. The optical head according to claim 1, wherein the plural light beams are present in four regions of the light beam separator, the four regions are separated from each other by an axis in the radial direction and an axis in a tangential direction, and the two axes pass through a substantial center of the light that is reflected from the information recording medium and travels in a straight path.

4. The optical head according to claim 1, further comprising an objective lens drive for driving the objective lens in the radial direction and a focusing direction,
   wherein the radial position signal is calculated by using an applied current to drive the objective lens in the radial direction.

5. The optical head according to claim 1, wherein the radial position signal is produced by calculating amounts of light in at least two regions of the light beam separator, and the at least two regions are outside the interference regions and are separated from each other by an axis in a tangential direction passing through a substantial center of the light that is reflected from the information recording medium and travels in a straight path.

6. The optical head according to claim 1, wherein the light beam separator is a hologram or a diffraction grating made of resin or glass.

7. The optical head according to claim 1, wherein the light beam separator comprises a λ/4 plate and a polarizing hologram that is located between the λ/4 plate and the semiconductor laser and has a diffraction effect only for a light beam of a predetermined polarization component, and the light-receiving element receives the light beam diffracted by the polarizing hologram.

8. The optical head according to claim 1, wherein the light beam separator is integrated with the objective lens and moved together with the objective lens in a focusing direction and the radial direction.

9. The optical head according to claim 1, further comprising a collimator lens between the objective lens and the semiconductor laser, wherein the collimator lens is integrated with the light beam separator.

10. An optical head comprising:
a semiconductor laser;
an objective lens for focusing a light beam from the semiconductor laser onto an information recording medium;
a light beam reflection portion that reflects the light beam from the semiconductor laser and moves together with the objective lens;
a light-receiving element that includes a light-receiving region for receiving the light beam reflected by the light beam reflection portion; and
an arithmetic circuit that detects the amount of tilt of the objective lens with respect to a predetermined reference plane by using an electrical signal detected by the light-receiving element and a radial position signal corresponding to the amount of shift of the objective lens in the radial direction.

11. The optical head according to claim 10, wherein the light beam reflection portion is formed in an objective lens holder for holding the objective lens.

12. The optical head according to claim 10, further comprising an objective lens drive for adjusting the inclination angle of the objective lens and a second light-receiving element for receiving a light beam reflected by the information recording medium,
wherein the relative angle between the information recording medium and the objective lens is detected by using an electrical signal detected by the second light-receiving element and the electrical signal of the light-receiving element while adjusting the inclination angle of the objective lens by the objective lens drive.

13. The optical head according to claim 10, further comprising an objective lens drive for driving the objective lens in the radial direction and the focusing direction,
wherein the radial position signal is calculated by using an applied current to drive the objective lens in the radial direction.

14. The optical head according to claim 10, further comprising a light beam separator that is located between the semiconductor laser and the objective lens,
wherein the radial position signal is produced by calculating the amounts of light in at least two regions of the light beani separator, and the at least two regions are outside interference regions for light that is reflected from the information recording medium and travels in a straight path and ±first-order diffracted light produced by information tracks of the information recording medium and are separated from each other by an axis in the tangential direction passing through a substantial center of the light that is reflected from the information recording medium and travels in a straight path.

15. An optical head comprising:
a semiconductor laser;
an objective lens for focusing a light beam from the semiconductor laser onto an information recording medium;
a light beam separator that is located between the semiconductor laser and the objective lens and forms a plurality of light spots on the information recording medium;
a light-receiving element that receives a light beam of each of the light spots reflected by the information recording medium, and converts received light to an electrical signal; and
an arithmetic unit that calculates the electrical signal converted by the light-receiving element, and detects the relative angle between the information recording medium and the objective lens.

16. The optical head according to claim 15, further comprising an objective lens drive for driving the objective lens in the radial direction and the focusing direction,
wherein rotational adjustment of the light beam separator with respect to the information recording medium is performed by rotating the objective lens drive around a central axis of the objective lens, and an arrangement of the light spots on the information recording medium is adjusted by the rotational adjustment.

17. The optical head according to claim 15, wherein the light beam separator is a hologram or a diffraction grating.

18. An optical head comprising:
a semiconductor laser for emitting divergent light:
an objective lens for focusing the divergent light from the semiconductor laser onto an information recording medium;
a light beam reflection portion that reflects a portion of a light beam traveling substantially outside an effective light beam diameter of the objective lens onto the information recording medium;
a light-receiving element including at least two light-receiving portions, each of which receives the light beam that is reflected by the light beam reflection portion and then is reflected by the information recording medium; and
an arithmetic unit that calculates the amount of light entering the light-receiving element, and detects the amount of tilt of the information recording medium with respect to a predetermined reference plane.

19. The optical head according to claim 18, further comprising an optical base for holding the semiconductor laser,
wherein the optical base is made of metal or resin, the light beam reflection portion is formed integrally with the optical base, and a light reflection film is formed on the light beam reflection portion.

20. The optical head according to claim 19, wherein the optical base is made of resin and formed integrally with the light beam reflection portion made of glass.

21. The optical head according to claim 18, wherein the light beam reflection portion is a light reflection film formed by deposition or application.

22. An optical head comprising:
a semiconductor laser for emitting divergent light;

an objective lens for focusing the divergent light from the semiconductor laser onto an information recording medium;

a collimator lens located between the semiconductor laser and the objective lens;

a light beam reflection portion that reflects part of a light beam traveling substantially outside an effective light beam diameter of the objective lens or the collimator lens Onto the information recording medium;

a light-receiving element including at least two light-receiving portions, each of which receives the light beam that is reflected by the light beam reflection portion and then is reflected by the information recording medium; and an arithmetic unit that calculates the amount of light entering the light-receiving element, and detects the amount of tilt of the information recording medium with respect to a predetemiined reference plane.

23. The optical head according to claim 22, wherein the light beam reflection portion is placed substantially outside an effective light beam diameter of the collimator lens and formed integrally near the exterior of the collimator lens.

24. The optical head according to claim 22, wherein the light beam reflection portion is formed by deposition, application, or coating of an aluminum reflection film or light reflection film near the exterior of the collimator lens.

25. An optical head comprising:
a semiconductor laser;
an objective lens for focusing a light beam from the semiconductor laser onto an information recording medium;
an objective lens drive for driving the objective lens;
a voltage controller for applying a voltage to the objective lens drive so that the objective lens is driven in a focusing direction;
a light-receiving element that receives a light beam reflected from the information recording medium and produces a focusing error signal; and
an arithmetic unit that detects a relative position of the information recording medium with respect to a predetermined reference position in the focusing direction, and calculates at least one selected from the relative angle between the information recording medium and the objective lens, the amount of tilt, the amount of warping, and the cross-sectional shape of the information recording medium by using a driving signal applied to the objective lens drive by the voltage controller and a focusing error signal produced by the light-receiving element.

26. The optical head according to claim 25, wherein the reference position is any one sclected from a turntable for holding the information recording medium, part of the optical head, and a guide shaft of the optical head.

27. The optical head according to claim 25, wherein the driving signal from the voltage controller is any one selected from a triangular wave, a sine wave and a trapezoidal wave.

28. The optical head according to claim 25, wherein the arithmetic unit detects relative positions of the information recording medium with respect to the reference position in the focusing direction in at least two different portions of the information recording medium in the radial direction, and calculates at least one selected from the amount of tilt of the information recording medium, the relative angle between the information recording medium and the objective lens, the amount of warping and the cross-sectional shape of the information recording medium by using the relative positions.

29. The optical head according to claim 28, wherein at least one selected from the amount of tilt corresponding to the calculated radial position of the information recording medium, the relative angle between the information recording medium and the objective lens, the amount of warping and the cross-sectional shape of the information recording medium is stored in a memory, and a tilt correction signal is generated to change the relative angle between the objection lens and the information recording medium in accordance with radial position by using information of the memory.

30. The optical head according to claim 15, wherein the relative angle detected is a tilt angle in a radial direction of the information recording medium.

* * * * *